US012486972B2

(12) United States Patent
Williams et al.

(10) Patent No.: US 12,486,972 B2
(45) Date of Patent: *Dec. 2, 2025

(54) MULTI-MOUNT SYSTEM FOR LIGHT

(71) Applicant: TECHTRONIC CORDLESS GP, Anderson, SC (US)

(72) Inventors: Brianna E. Williams, Greenville, SC (US); Lawrence Fung Pok Lo, Hong Kong (CN); Chun Kit Cheung, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,719

(22) Filed: Jan. 26, 2024

(65) Prior Publication Data

US 2024/0159383 A1 May 16, 2024

Related U.S. Application Data

(63) Continuation of application No. 17/861,937, filed on Jul. 11, 2022, now Pat. No. 11,920,768.

(Continued)

(51) Int. Cl.
*F21V 21/14* (2006.01)
*F21L 4/04* (2006.01)

(Continued)

(52) U.S. Cl.
CPC .............. *F21V 21/145* (2013.01); *F21L 4/04* (2013.01); *F21L 4/045* (2013.01); *F21V 21/084* (2013.01);

(Continued)

(58) Field of Classification Search
CPC ......... F21L 4/04; F21L 4/045; F21V 21/0965; F21V 21/0885
See application file for complete search history.

(56) References Cited

U.S. PATENT DOCUMENTS 5,577,697 A 11/1996 Accordino
6,457,841 B1 10/2002 Lynch et al.

(Continued)

OTHER PUBLICATIONS

Extended European Search Report for Application No. 22183256.1 dated Mar. 28, 2023 (12 pages).

(Continued)

*Primary Examiner* — William N Harris
(74) *Attorney, Agent, or Firm* — Michael Best & Friedrich LLP

(57) ABSTRACT

A headlamp assembly comprising an adjustable strap, a mount receiver, a light, and a mount attachment. The mount receiver is coupled to the adjustable strap. The light includes a body, a head pivotably coupled relative to the body by a hinge, and a light emitting element supported on the head. The mount attachment includes a first attachment structure configured to selectively engage the light and a second attachment structure configured to selectively engage the mount receiver. The first attachment structure and second attachment structure are operable independent of one another such that the light is capable of being removed from the mount receiver either by removing the light from the mount attachment or by removing the light and the mount attachment from the mount receiver.

20 Claims, 40 Drawing Sheets

Related U.S. Application Data

(60) Provisional application No. 63/221,147, filed on Jul. 13, 2021.

(51) Int. Cl.
*F21V 21/084* (2006.01)
*F21V 21/088* (2006.01)
*F21V 21/096* (2006.01)

(52) U.S. Cl.
CPC ...... *F21V 21/0885* (2013.01); *F21V 21/0965* (2013.01)

(56) References Cited

U.S. PATENT DOCUMENTS

| | | | | |
|---|---|---|---|---|
| D719,286 | S | 12/2014 | Inskeep | |
| D743,598 | S * | 11/2015 | Inskeep | D26/39 |
| 10,465,887 | B1 | 11/2019 | Levy et al. | |
| 10,670,201 | B1 * | 6/2020 | Noble | F21L 4/005 |
| 2006/0087833 | A1 * | 4/2006 | Simoni | F21V 21/30<br>362/103 |
| 2007/0103917 | A1 | 5/2007 | Wu et al. | |
| 2012/0033415 | A1 | 2/2012 | Sharrah et al. | |
| 2012/0182748 | A1 | 7/2012 | McCaslin et al. | |
| 2012/0212968 | A1 | 8/2012 | Brown | |
| 2018/0340661 | A1 | 11/2018 | Inskeep | |
| 2019/0331306 | A1 | 10/2019 | Westling et al. | |
| 2019/0331326 | A1 | 10/2019 | Proeber et al. | |
| 2021/0033248 | A1 | 2/2021 | Cacciabeve | |
| 2021/0172588 | A1 | 6/2021 | Kaye et al. | |
| 2022/0034491 | A1 * | 2/2022 | Ross | F21L 4/045 |

OTHER PUBLICATIONS

European Patent Office Action for Application No. 22183256.1 dated Oct. 23, 2025 (8 pages).

* cited by examiner

MULTI-MOUNT SYSTEM FOR LIGHT

CROSS-REFERENCE TO RELATED APPLICATION

This application is a continuation of U.S. Non-Provisional patent application Ser. No. 17/861,937 filed Jul. 11, 2022, which claims to the benefit of U.S. Provisional Patent Application No. 63/221,147 filed Jul. 13, 2021, the entire contents of which are incorporated herein by reference.

FIELD OF THE DISCLOSURE

The application relates to a mount, more particularly, to a mount system for a light.

BACKGROUND OF THE DISCLOSURE

Lights are frequently moved and removed from various mounting structures. Traditional lights which are capable of being coupled to headbands are generally fixed to the headband. Such fixed headband lights have limited adjustability, and thus cast light in sub-optimal directions.

SUMMARY OF THE DISCLOSURE

The present disclosure provides, in one aspect, a mount system including a mount receiver, a light, and a mount attachment. The light includes a body, a head pivotably coupled relative to the body by a hinge, and a light emitting element mounted on the head. The mount attachment is configured to engage both the mount receiver and the light to secure the light to the mount receiver.

The present disclosure provides, in another aspect, a mount system including a mount receiver, a light, and a clip. The light includes a body, a head pivotably coupled relative to the body by a hinge, and a light emitting element mounted on the head. The clip is configured to engage the light and the mount receiver to secure the light to the mount receiver.

The present disclosure provides, in another aspect, a mount system including a mount system including a mount receiver and a light. The mount receiver is at least partially magnetic or has a mount magnet. The light includes a body, a head pivotably coupled relative to the body by a hinge a light emitting element mounted on the head, and a light magnet supported by the body. The light magnet is configured to be magnetically coupled to the mount receiver to secure the light to the mount receiver.

Other aspects will become apparent by consideration of the detailed description and the accompanying drawings.

Figure 1:
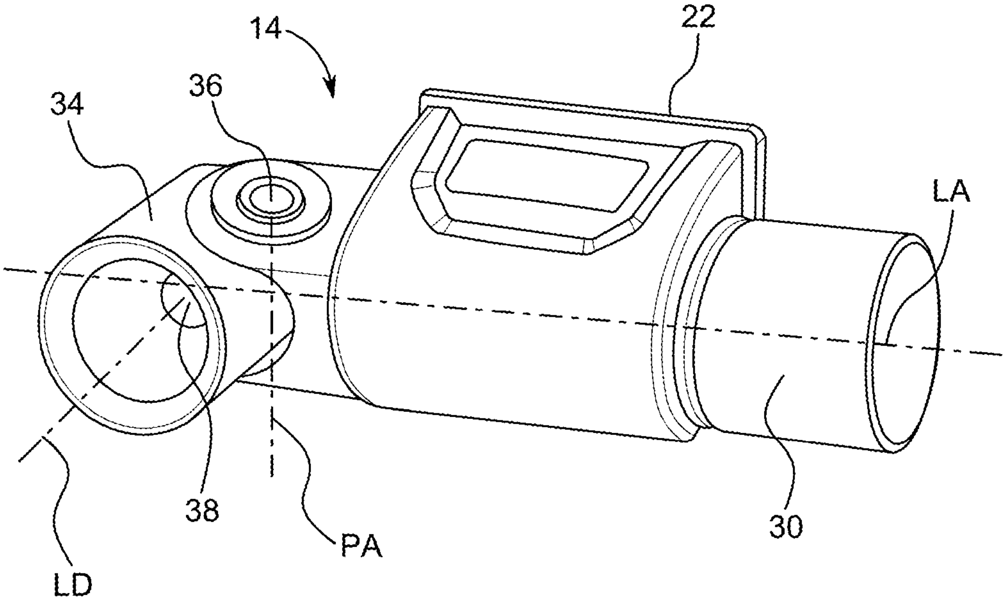
FIG. 1 is a perspective view of a mount system including a light and a mount attachment.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

DETAILED DESCRIPTION

Figure 2:
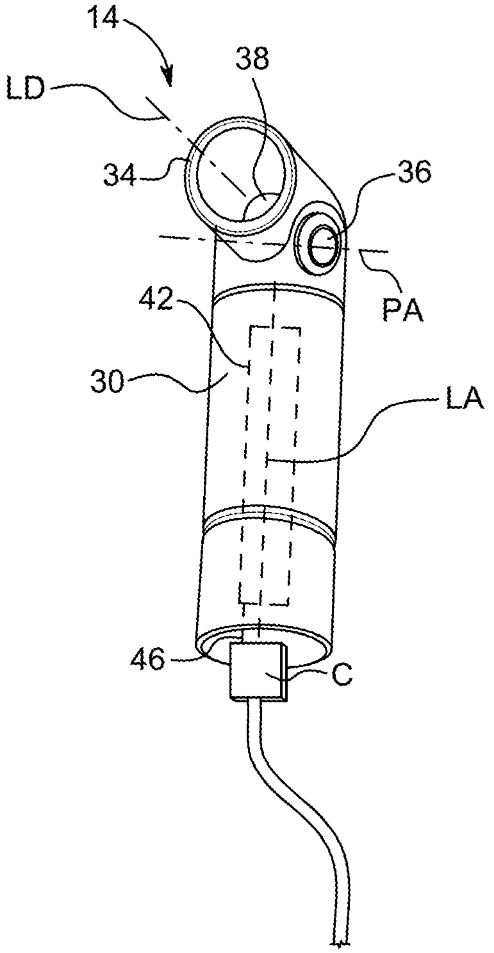
FIG. 2 is a perspective view of the light of the mount system of FIG. 1.
Figure 3:
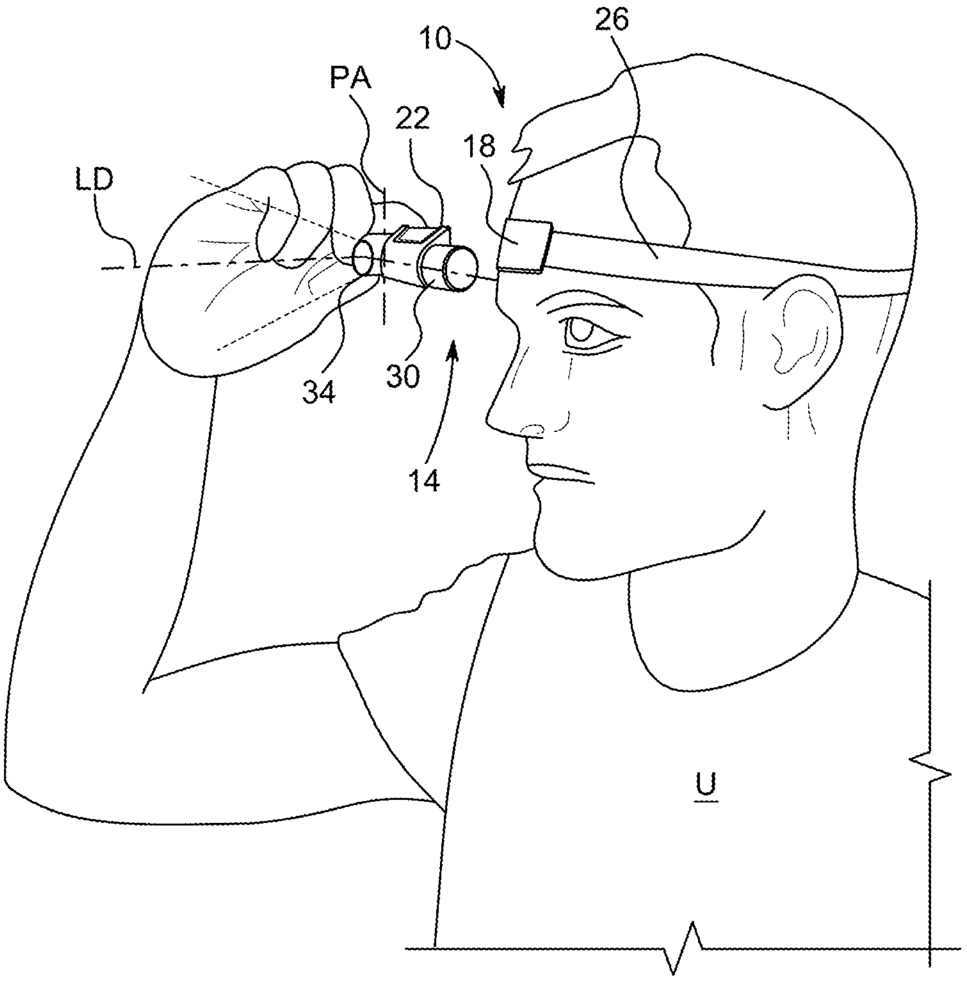
FIG. 3 is a perspective view of the mount system of FIG. 1 including the light, the mount attachment, and a mount receiver.

FIGS. 1-3 illustrate a mount system 10 (FIG. 3) for supporting a light 14 on a mount receiver 18 (FIG. 3). The mount system 10 may include the light 14, the mount receiver 18, and a mount attachment 22 (FIG. 1). Optionally, the mount attachment 22 is integrally formed with the light 14. In other embodiments, the mount attachment 22 is removable from the light 14.

FIG. 1 illustrates the light 14 engaged with the mount attachment 22. The mount attachment 22 may be operable to attach the light 14 to the mount receiver 18 (FIG. 3). In the illustrated embodiment, the mount attachment 22 and the mount receiver 18 may include magnets, and magnetic force between the magnets of the mount receiver 18 and the mount attachment 22 may connect the light 14 to the mount receiver 18. As illustrated in FIG. 1, the light 14 may be received at least partially within the mount attachment 22. As illustrated in FIG. 1, the light 14 may be used when secured to the mount attachment 22, but removed from the mount receiver 18.

FIG. 2 illustrates the light 14 disengaged from the mount attachment 22. The light 14 may include a body 30 and a head 34. In some embodiments, the head 34 may be movable (e.g., pivotable) relative to the body 30. The body 30 extends along a longitudinal axis LA. A hinge 36 may connect the body 30 and the head 34. The head 34 may be permitted to rotate about the hinge 36. In the embodiment of the light 14 illustrated in FIGS. 1-3, the hinge 36 may be a double ended hinge generally defining a U-shape of the body 30 within which the head 34 is rotatable, the head 34 engaging both ends of the U-shape of the body 30. A light emitting element 38 may be provided on the head 34 such that the light emitted from the light emitting element 38 is directed in a desired direction by pivoting the head 34. In the illustrated embodiment, the light emitting element 38 is a light emitting diode (LED). Other light emitting elements 38 are possible. As illustrated in FIG. 2, the light 14 may be used separately from the mount attachment 22.

FIG. 2 further illustrates a charging cable C which is operable to connect an external power source (not shown) to a battery 42 provided within the body 30 of the light 14. In some embodiments, the battery 42 may be a battery pack including a plurality of battery cells. In the illustrated embodiment, the battery 42 may include a single cell battery 42. More specifically, the cable C may engage a charging port 46 provided at the exterior of the body 30 and in electrical communication with the battery 42. The external power source may be, for example, from a direct current power source or from an alternating current power source. The battery 42 may have a capacity of at least 800 mAh and as much as 7000 mAh. Other higher or lower capacities may be functional. In the illustrated embodiments, the battery 42 may have either a 1200 mAh capacity or a 3000 mAh capacity. The proposed embodiments of the battery 42 may be manufactured under the trade names Keeppower UH 1835P, Samsung INR18650-30Q, and Samsung INR18350-30Q, respectively. Other batteries 42 and/or power sources may be functional.

FIG. 3 illustrates a user U connecting or disconnecting the mount receiver 18 from the mount attachment 22. In the illustrated embodiment, the mount attachment 22 may be connected to a headband 26 which may be worn by the user U. In the embodiment illustrated in FIG. 3, the mount system 10 may be a headlamp worn by the user U configured to direct light emitted by the light 14 away from the user U. In the embodiment illustrated in FIG. 3, the hinge 36 may be directed along a pivot axis PA. In the illustrated embodiment of FIG. 1, the pivot axis PA is generally perpendicular to the longitudinal axis LA. The pivot axis PA may extend between the ends of the U-shape of the body 30. The pivot axis PA permits rotation of the head 34 in a direction such that light emitted by the light emitting element 38 is directed along a light direction LD (e.g., the head 34 points along the light direction LD) which is adjustable in a lateral direction extending generally to the left and right of the front end of the user U while the user U wears the headband 26.

In operation of the mount system 10, the light 14 and the mount attachment 22 may be secured or removed from the mount receiver 18 depending on desired use of the light 14. In operations which the light 14 is desired to be used without attachment to the mount receiver 18, the light 14 may be removed from the mount receiver 18 and operated as a torch. In such operations, the mount attachment 22 may or may not be removed from the light 14. In other operations, the mount attachment 22 may engage the mount receiver 18 of a headband 26, and the light 14 may be operated as a headlamp.

Figure 6:
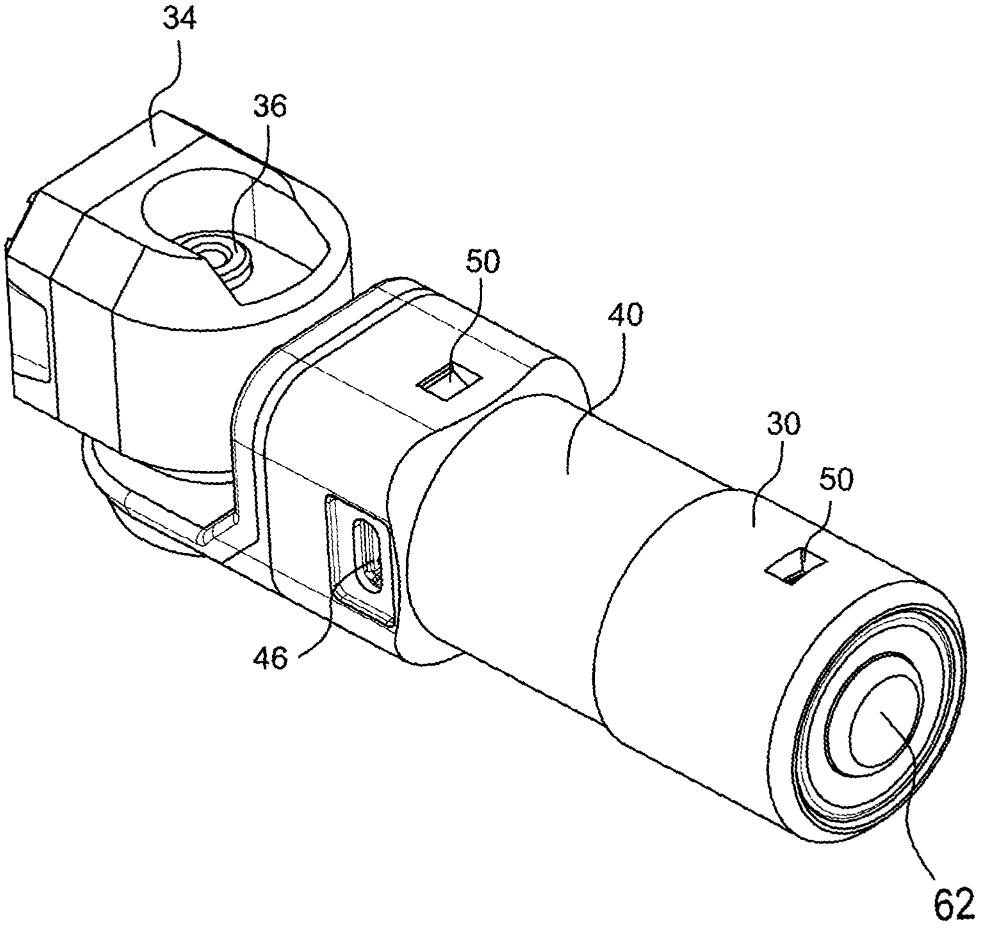
FIG. 6 is another perspective view of the light of FIG. 4.
Figure 7:
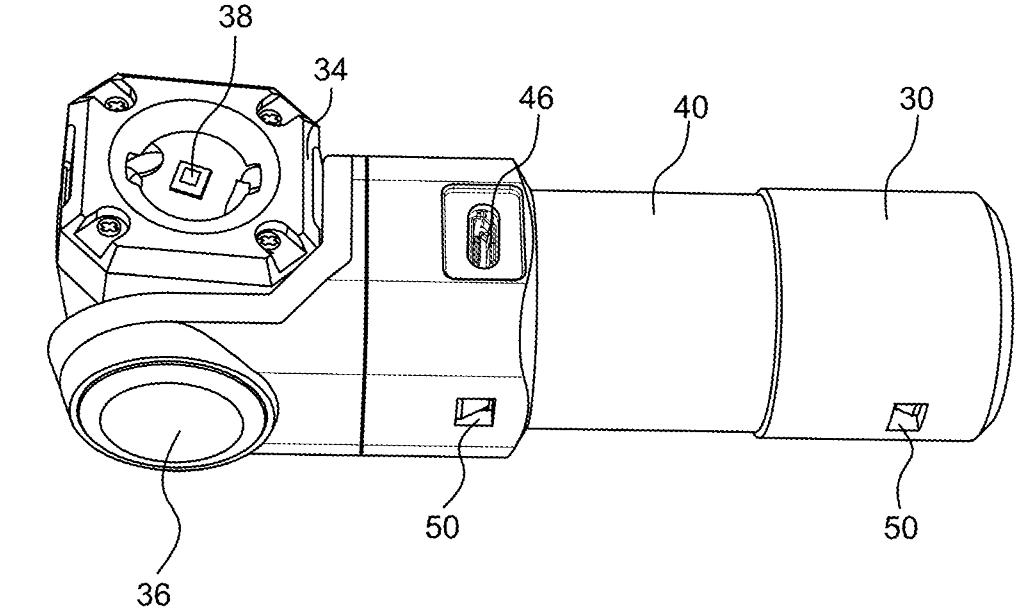
FIG. 7 is another perspective view of the light of FIG. 4.
Figure 8:
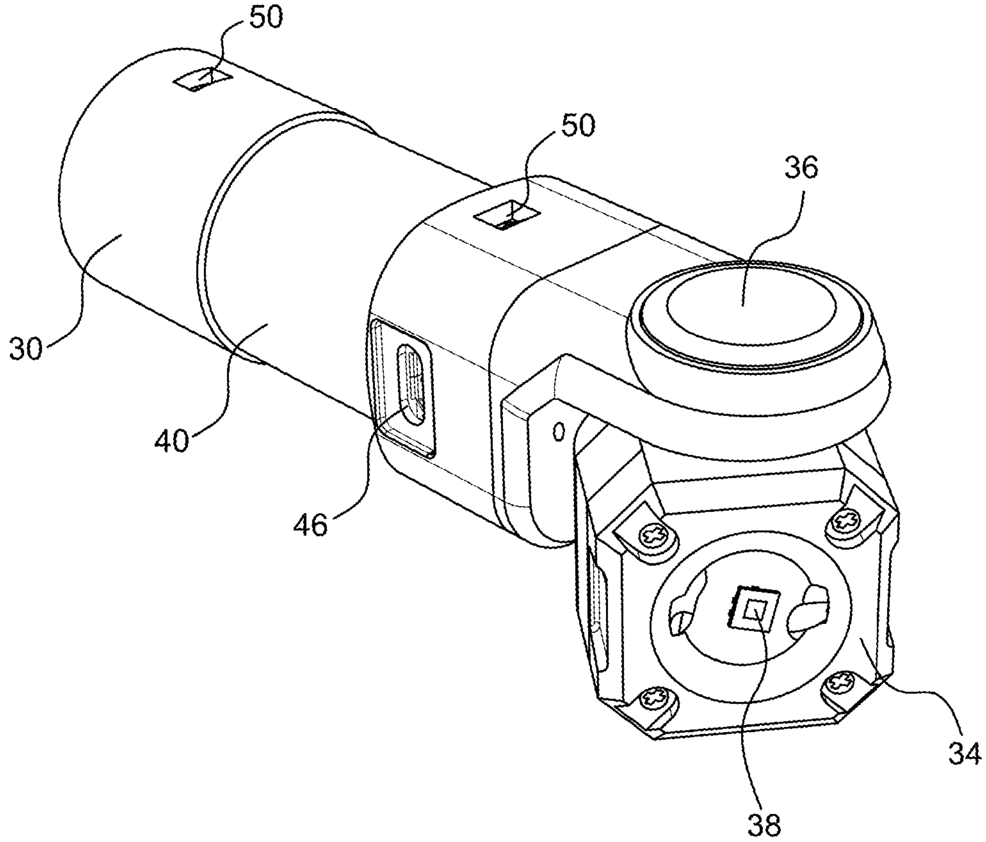
FIG. 8 is another perspective view of the light of FIG. 4 with a head tilted relative to a body of the light.
Figure 9:
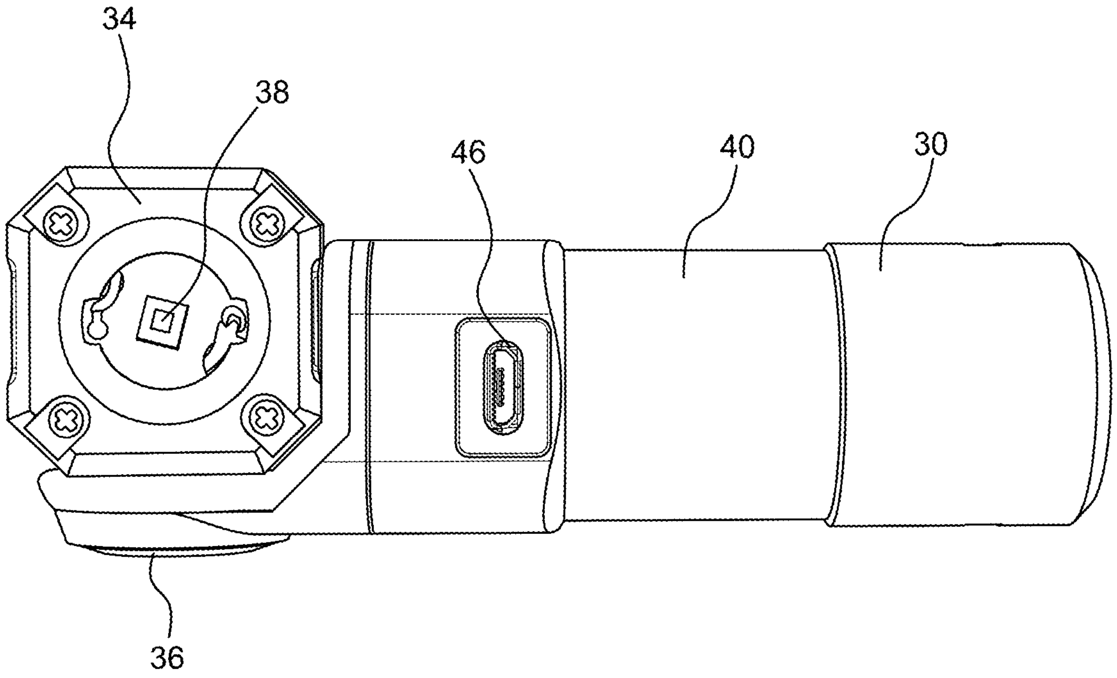
FIG. 9 is another perspective view of the light of FIG. 4.
Figure 10:
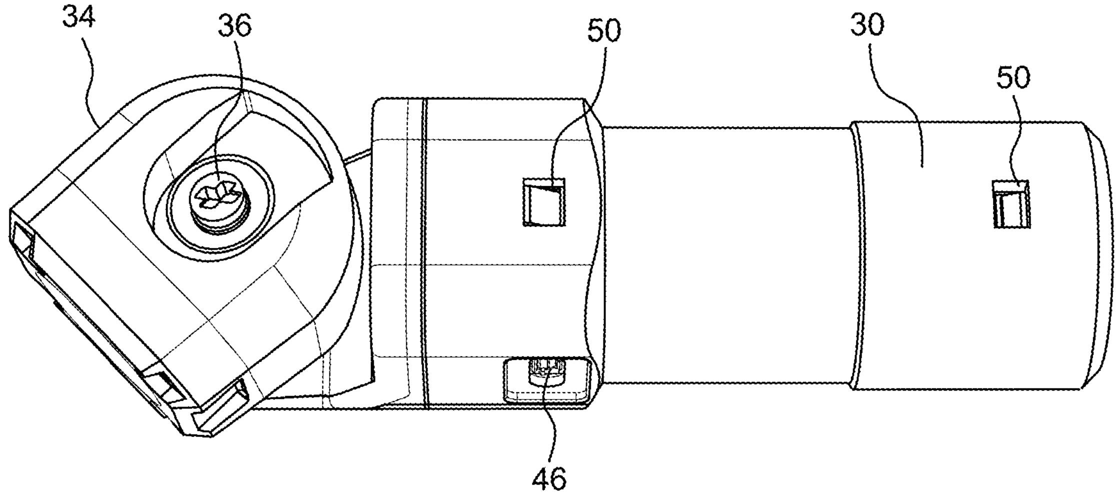
FIG. 10 is another perspective view of the light of FIG. 4 with the head tilted relative to the body of the light.

FIGS. 4-10 illustrate another light 14. The light 14 may include a hinge 36 that is secured to the body 30 at a single end of the hinge 36. FIGS. 4-10 illustrate the head 34 in a plurality of different rotational positions relative to the body 30. As illustrated in at least FIGS. 4-6, the head 34 may be rotated such that the light emitting element 38 is directed along the light direction LD which is parallel to a longitudinal axis LA of the body 30. As illustrated in FIG. 7, the head 34 is rotated such that the light direction LD is generally perpendicular with the longitudinal axis LA. As illustrated in at least FIGS. 8 and 10, the light emitting element 38 may be directed along the light direction LD which is provided at an angle relative to the longitudinal axis LA. In some embodiments, the angle may be an oblique angle (i.e., nonzero and not 90 degrees).

Figure 4:
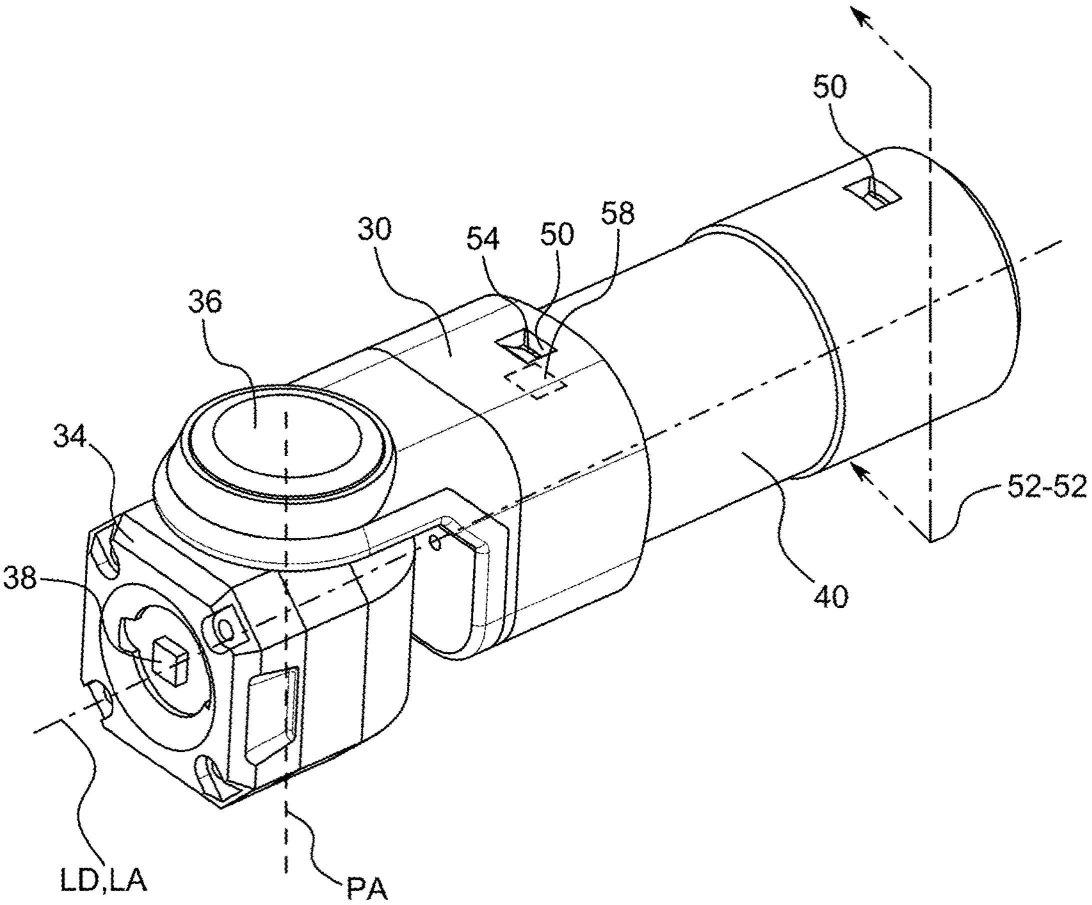
FIG. 4 is a top perspective view of another embodiment of the light of FIG. 1.
Figure 5:
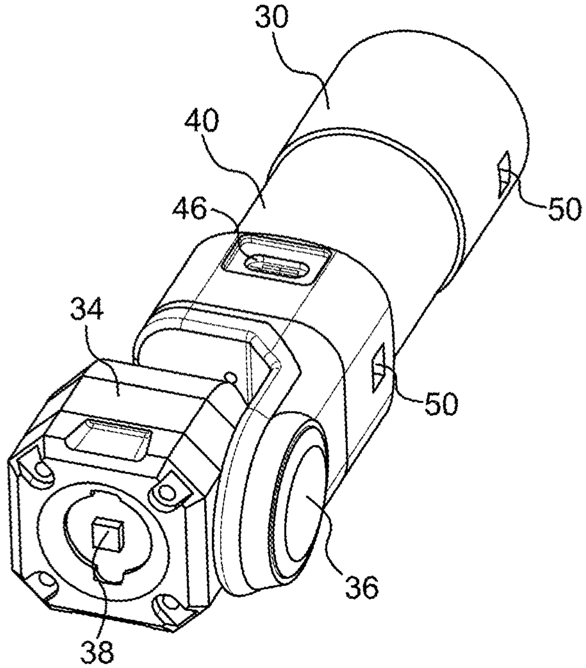
FIG. 5 is another perspective view of the light of FIG. 4.
Figure 33:
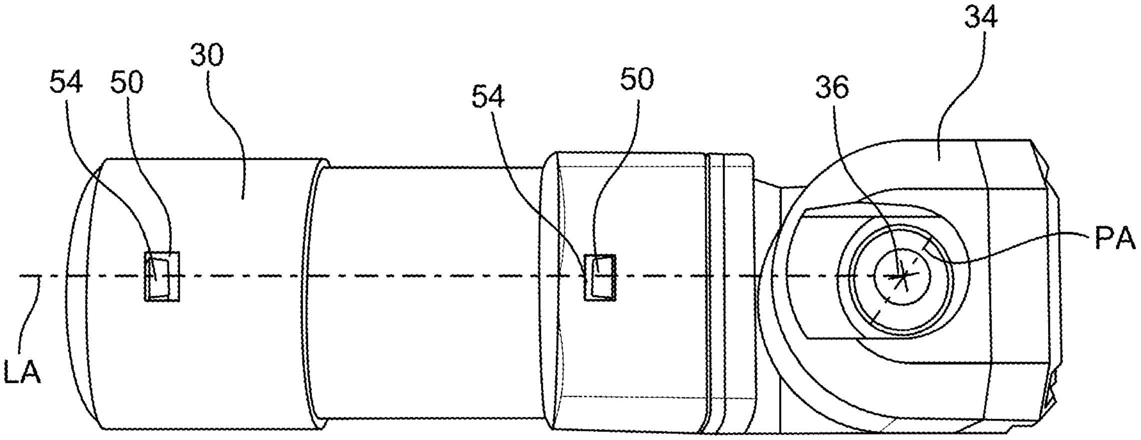
FIG. 33 is a first side view of the light of FIG. 11.

The light 14 illustrated in FIGS. 4-10 may further include snap openings 50. The snap openings 50 may provide an aperture 54 in an outer surface of the body 30. The illustrated apertures 54 are through holes, but may alternatively be recesses formed in the body 30. The snap openings 50 may be configured to secure portions of the body 30 to one another during assembly of the light 14. The snap openings 50 are further illustrated in FIGS. 33 and 34. In the illustrated embodiment, the light 14 may include two snap openings 50. In other embodiments, the light 14 may include fewer or more snap openings 50. In some embodiments, the snap openings 50 may be omitted. As illustrated in FIG. 4, the body 30 may further include a charge indicator light 58. The charge indicator light 58 may be positioned adjacent at least one of the snap openings 50 such that the charge indicator light 58 emits light through the aperture 54. In other embodiments, the charge indicator light 58 may emit light through a different opening. In some embodiments, the charge indicator light 58 can emit a first color of light (e.g., red light) when the cable C is connected to the charging port 46 and the battery 42 is charging. In some embodiments, the charge indicator light 58 can emit a second color of light (e.g., green light) when the cable C is connected to the charging port 46 and the battery 42 has completed charging. Other arrangements of operating the charge indicator light 58 may otherwise indicate the charge status of the battery 42.

As illustrated in FIG. 6, the light 14 may include an actuator 62 which controls operation of the light emitting element 38. The illustrated actuator 62 may be a button. In other embodiments, the light 14 may include other suitable types of actuators (e.g., a rocker switch, a slide switch, a dial, etc.). In the illustrated embodiment, the actuator 62 may be provided at an exterior end surface of the body 30 opposite the head 34. The actuator 62 may be otherwise located on either the body 30 or the head 34. In some embodiments, the actuator 62 is depressed to adjust operation of the light emitting element 38 between an "ON" mode and an "OFF" mode. In another embodiment, the actuator 62 may adjust the light emitting element 38 between three modes of operation sequentially. In such other embodiment, the actuator 62 may be depressed to activate a "LOW LIGHT" mode, a "HIGH LIGHT" mode, and the "OFF" mode. In the low light mode, a relatively intensity of light is emitted from the light emitting element 38. In the high light mode, a relatively high intensity of light is emitted from the light emitting element 38.

In some embodiments, the actuator 62 may be depressed in a cycle to transition the light emitting element 38 between the modes. In the cycle, the actuator 62 is depressed to transition the light element 38 between the "LOW LIGHT" mode to the "OFF" mode. A subsequent depression of the actuator 62 transitions the light emitting element 38 between the "OFF" mode to the "HIGH LIGHT" mode. A subsequent depression of the actuator 62 transitions the light emitting element 38 between the "HIGH LIGHT" mode to the "OFF" MODE. A subsequent depression of the actuator 62 transitions the light emitting element 38 from the "OFF" mode to the "LOW LIGHT" mode, and the cycle begins again. Other cycles of operating the light emitting element 38 based on depression of the actuator 62 are possible.

Figure 11:
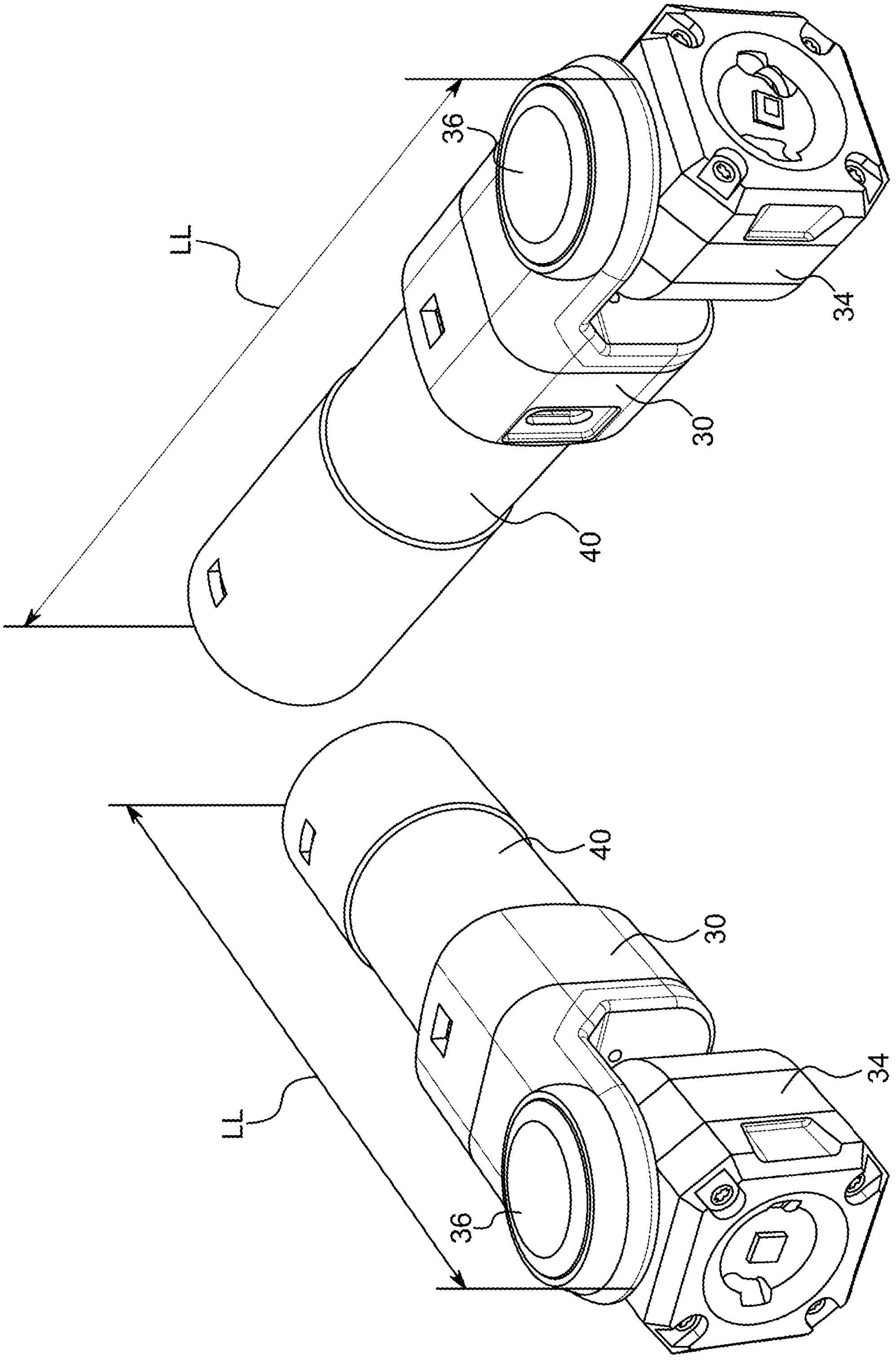
FIG. 11 is a perspective view of a first light and of a second light.
Figure 12:
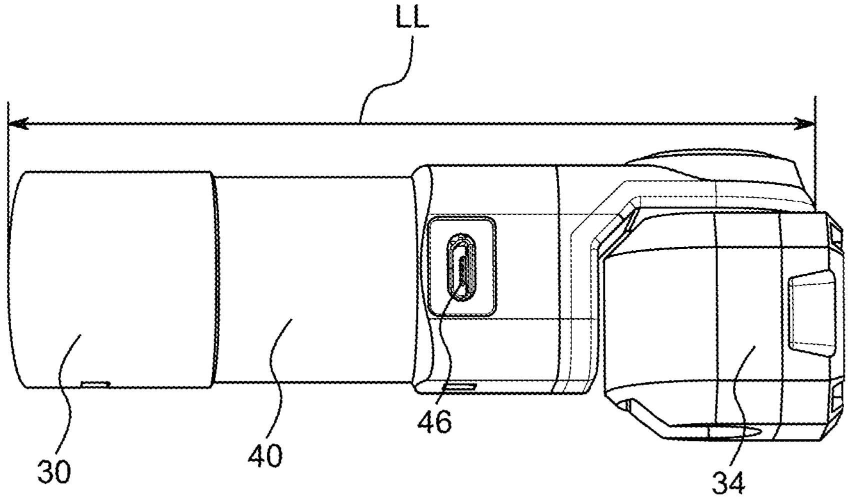
FIG. 12 is a top view of the first light of FIG. 11.
Figure 13:
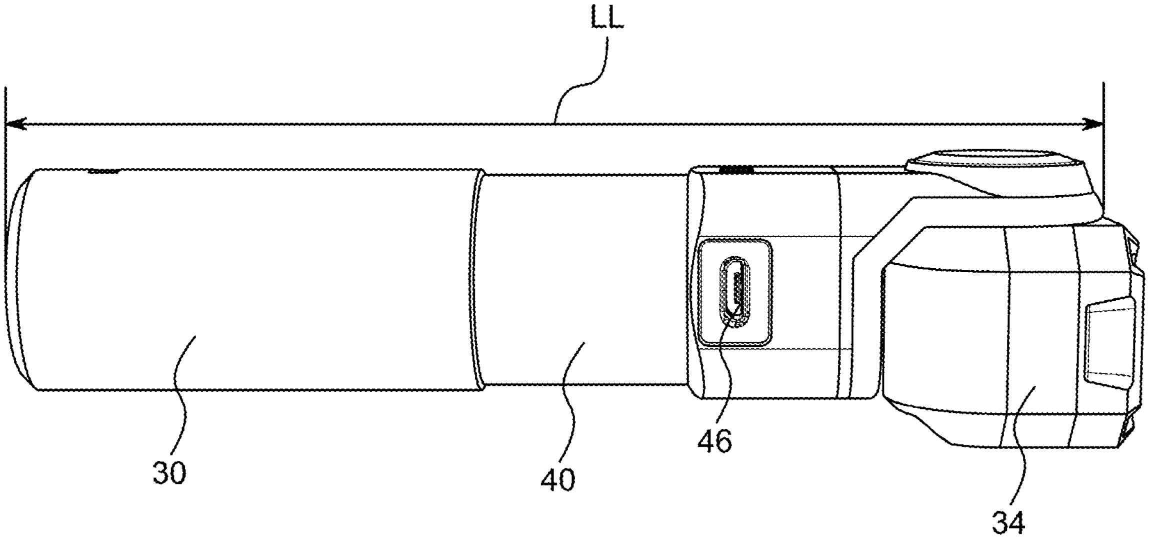
FIG. 13 is a top view of the second light of FIG. 11.
Figure 14:
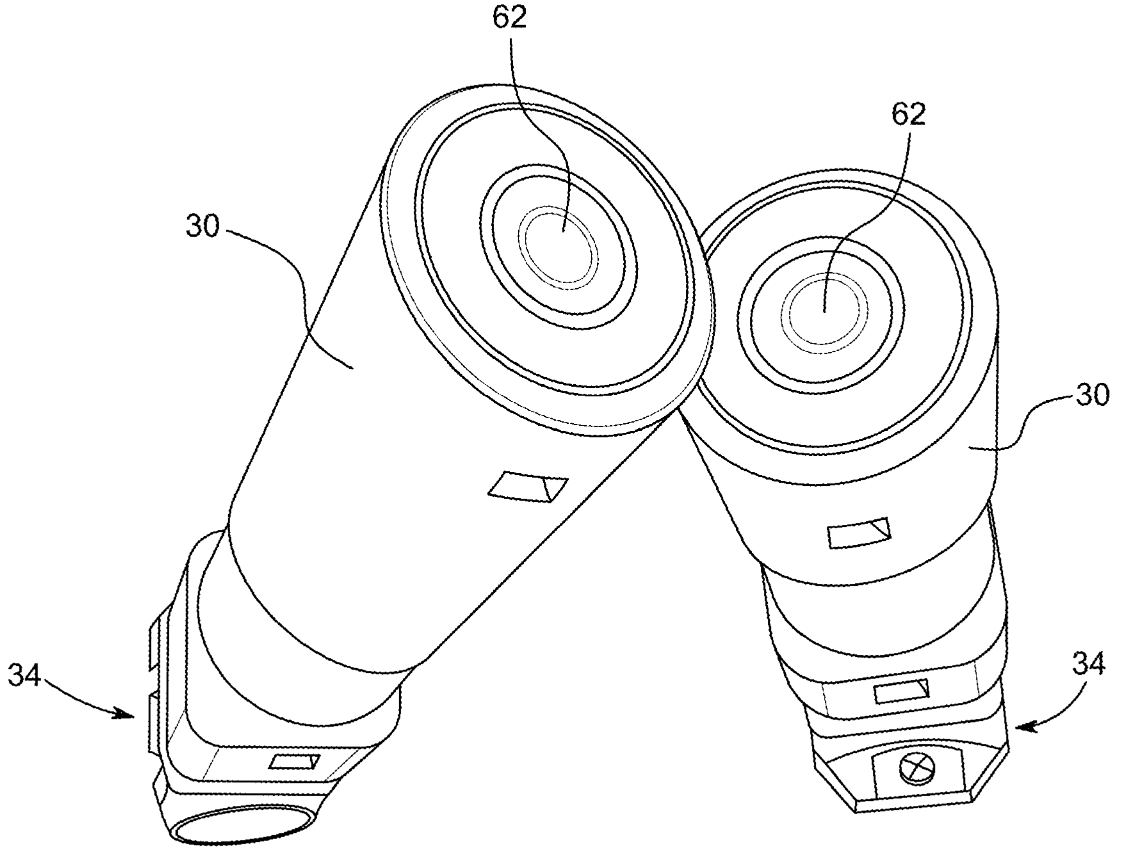
FIG. 14 is another perspective view of the first light and the second light of FIG. 11.

FIGS. 11-13 illustrate different embodiments of the light 14 having different longitudinal lengths LL along the longitudinal axis LA and bounded by opposite ends of the body 30. FIGS. 12 and 13 also illustrate a reduced diameter portion 40 of the body 30 which may be used to secure the mount attachment 22 to the body 30 (e.g., as in FIG. 22, described below). FIG. 14 illustrates that each of the lights of FIGS. 12 and 13 may include a actuator 62 as described above.

Figure 15:
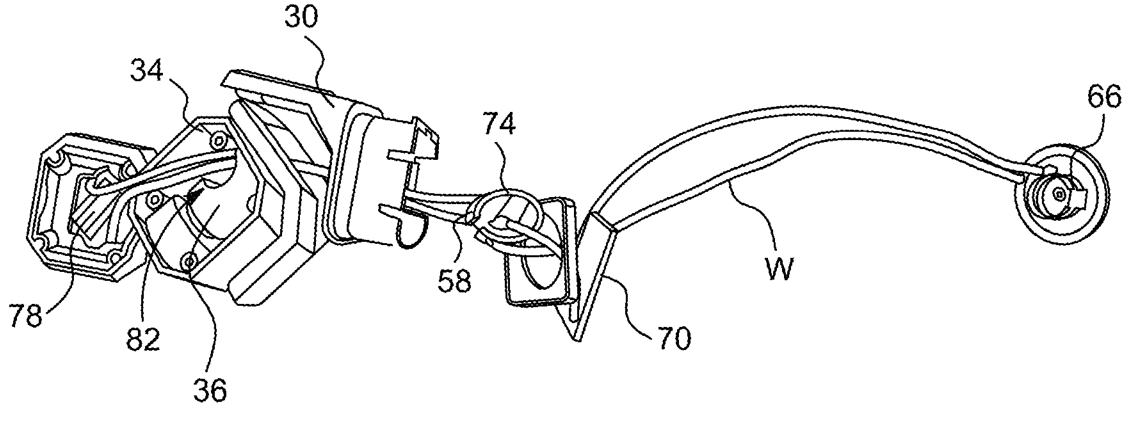
FIG. 15 is a view of the first light of FIG. 11 with the body removed to illustrate internal components of the first light.
Figure 32:
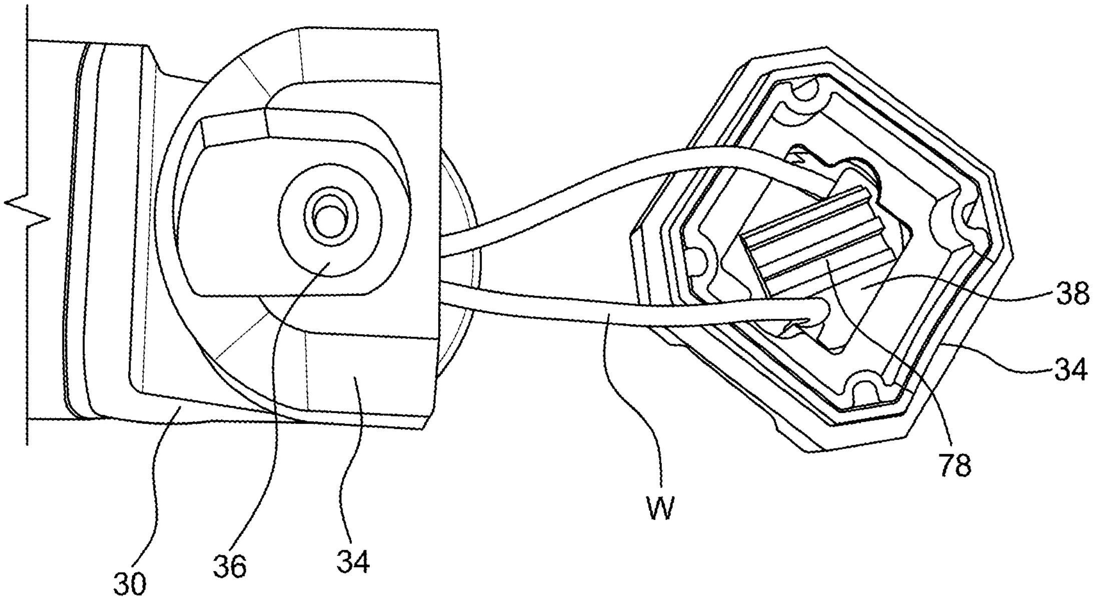
FIG. 32 is a top view of the light of FIG. 11 with the head disassembled to illustrate internal components of the head.

FIG. 15 illustrates the internal components of the light 14. The light 14 may include a first battery terminal 66 and a second battery terminal 70 operable to engage opposing sides of the battery 42. Within the body 30, the first and second battery terminals 66, 70 may be spaced to correspond to the size of the battery 42 such that the terminals 66, 70 contact opposite ends of the battery 42. Wires W may connect the first and second battery terminals 66, 70 to a control board 74. The control board 74 may also be electrically coupled to the actuator 62. Wires W may also extend from the control board 74 to the light emitting element 38. Upon depression of the actuator 62, the light emitting element 38 may be transitioned (in some embodiments, in a cycle) between the above described operating modes. A heat sink 78 may be provided within the head 34 and on an internal side of the light emitting element 38. The heat sink 78 may be configured to dissipate heat generated by the light emitting element 38. The heat sink 78 may mitigate chances of the light emitting element 38 from overheating during operation. FIG. 32 further illustrates the heat sink 78 applied to the interior surface of the light emitting element 38. Also within the head 34, the hinge 36 is optionally provided with an aperture 82 (FIG. 52) through which the wires W between the control board 74 and the light emitting element 38 may pass through.

Figure 16:
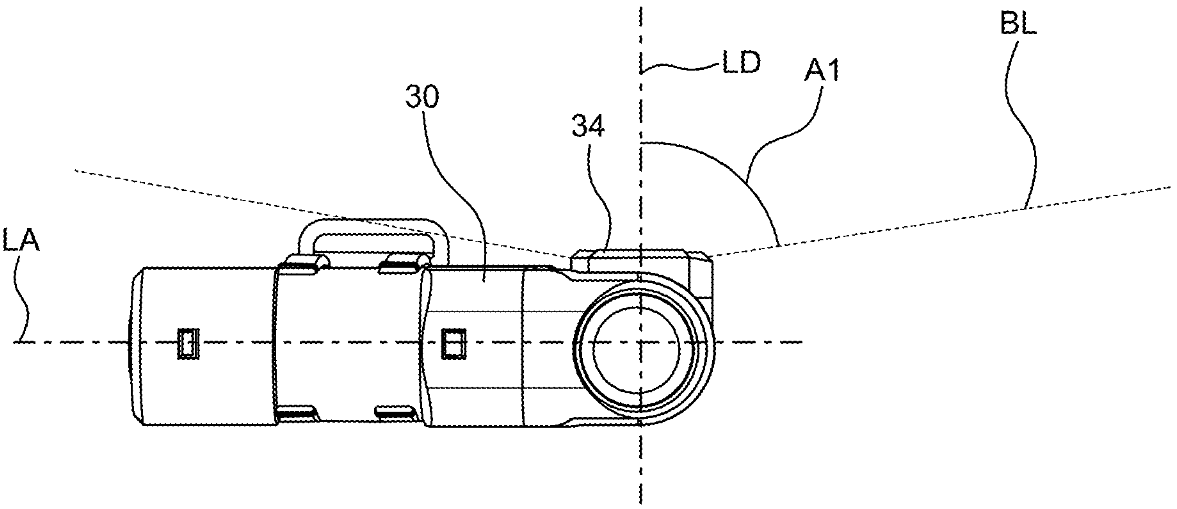
FIG. 16 is a top view of the first light of FIG. 11 with the first light illuminated.
Figure 17:
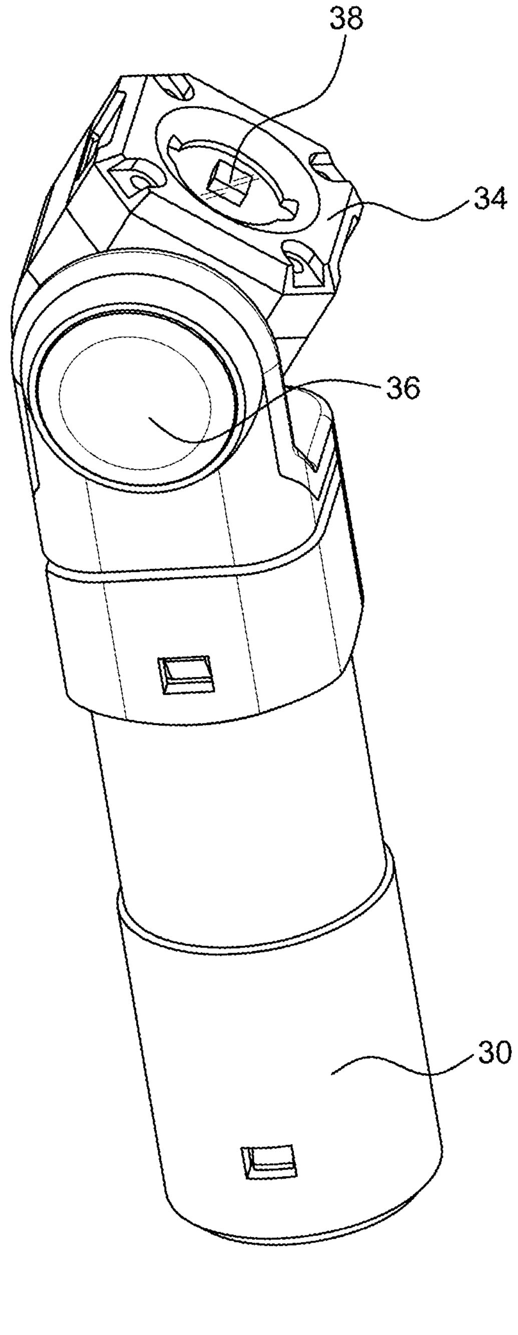
FIG. 17 is a perspective view of the first light of FIG. 11 with the first light illuminated and the head provided at an angle relative to the body.
Figure 18:
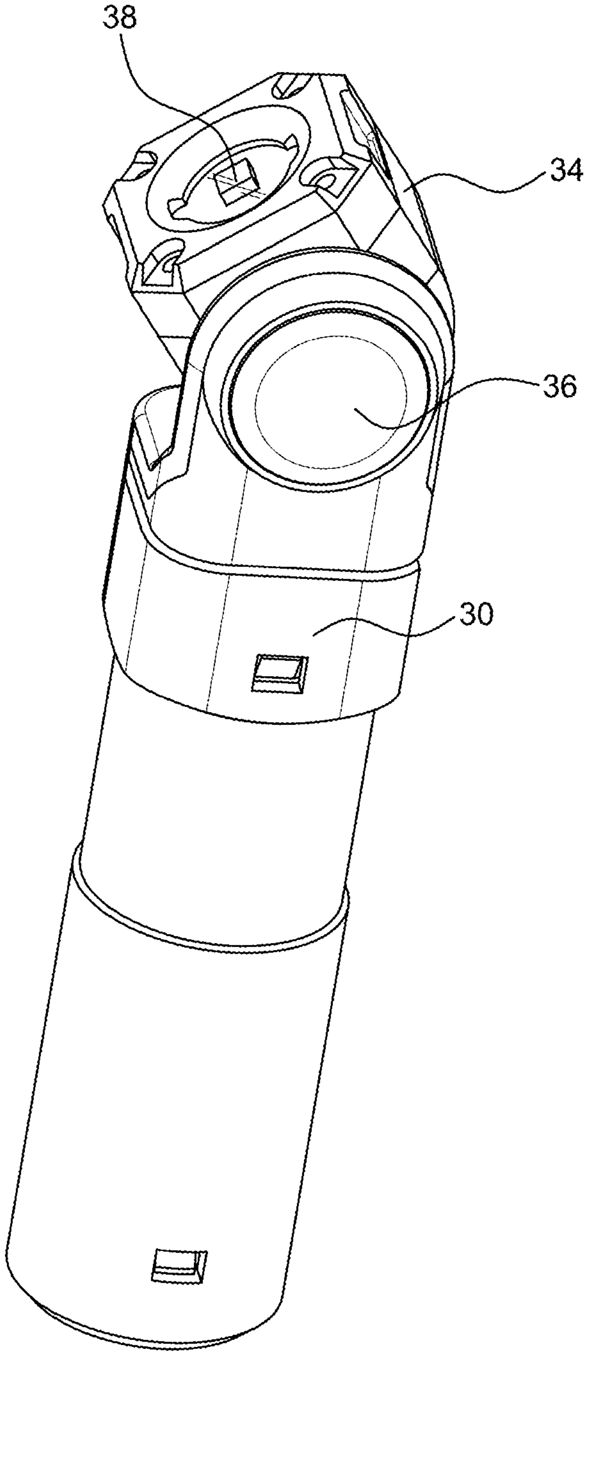
FIG. 18 is a perspective view of the second light of FIG. 11 with the second light illuminated and the head provided at an angle relative to the body.

FIGS. 16-18 illustrate the light 14 with the light in an "ON" mode. As illustrated in FIG. 16, the head 34 is generally perpendicular with respect to the body 30 such that the light direction LD is perpendicular to the longitudinal axis LA. The light emitted by the light emitting element 38 extends along the LD and extends away from the light emitting element 38 in a light cone having a light cone angle A1. The light cone angle A1 may extend between the light direction LD and a boundary line BL of the light emitted by the light emitting element 38. FIGS. 17 and 18 illustrate that the light 14 may be operated in the "ON" mode with the head 34 in angled with respect to the body 30.

Figure 19:
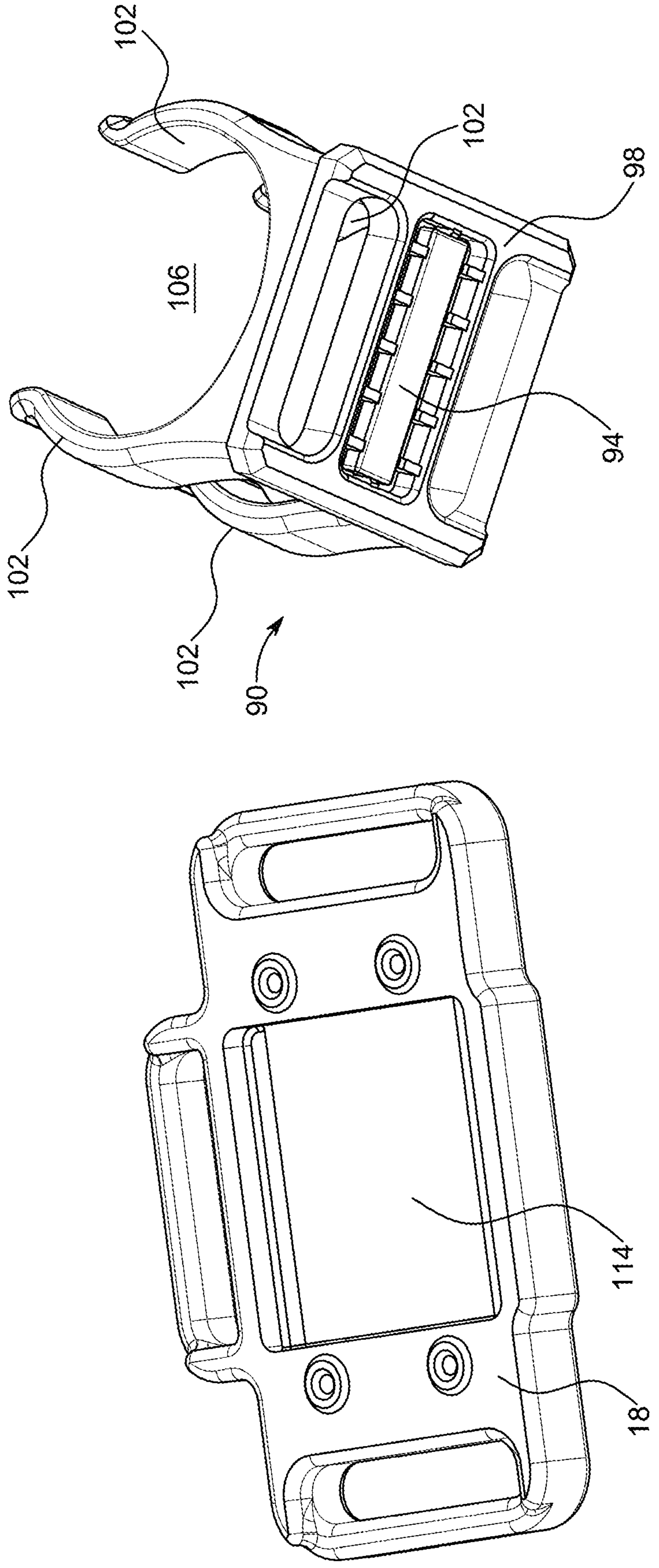
FIG. 19 is a perspective view of another mount system including a c-clip and a mount receiver.
Figure 20:
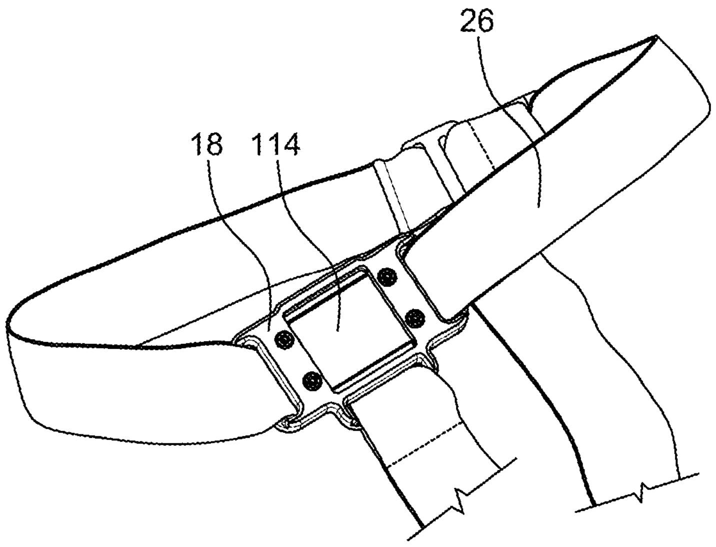
FIG. 20 is a perspective view of the mount receiver of FIG. 19 engaging a strap.
Figure 21:
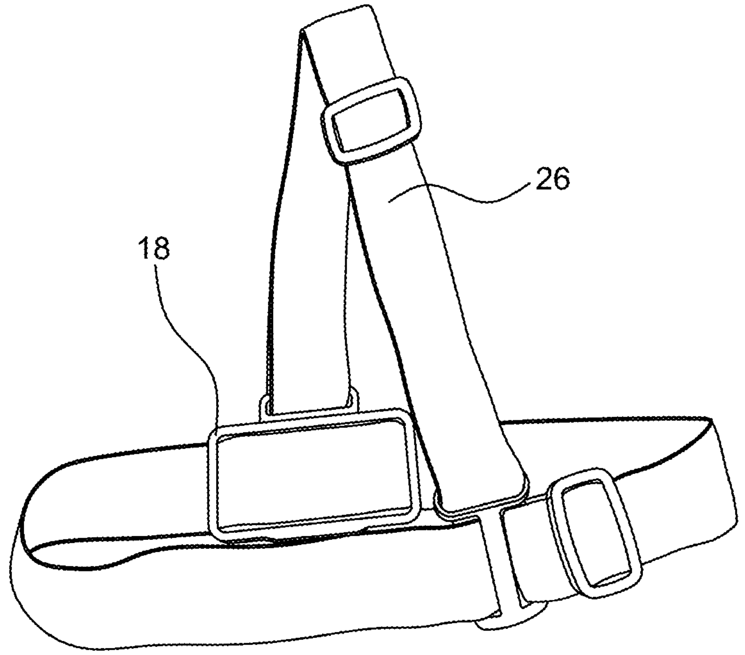
FIG. 21 is another perspective view of the mount receiver of FIG. 19 engaging the strap.

FIGS. 19-21 illustrate components of another mount system 10 including the mount attachment 22 which is separate from the light 14. In the mount system 10, the headband 26 may include adjustable straps which converge at the mount receiver 18. The mount receiver 18 may include a mount magnet 114. The mount attachment 22 in the mount system 10 may be formed as a c-clip 90. The c-clip 90 may include a magnet 94 (e.g., a clip magnet 94). The c-clip 90 may be defined by a body portion 98 and lever arms 102. The body portion 98 may house the magnet 94. The lever arms 102 may extend from the body portion 98 to define a cylindrical void 106 between the lever arms 102. In the illustrated embodiment, the c-clip 90 may include four lever arms 102 which each extend away from the body portion 98. Other arrangements of lever arms 102 are possible.

Figure 22:
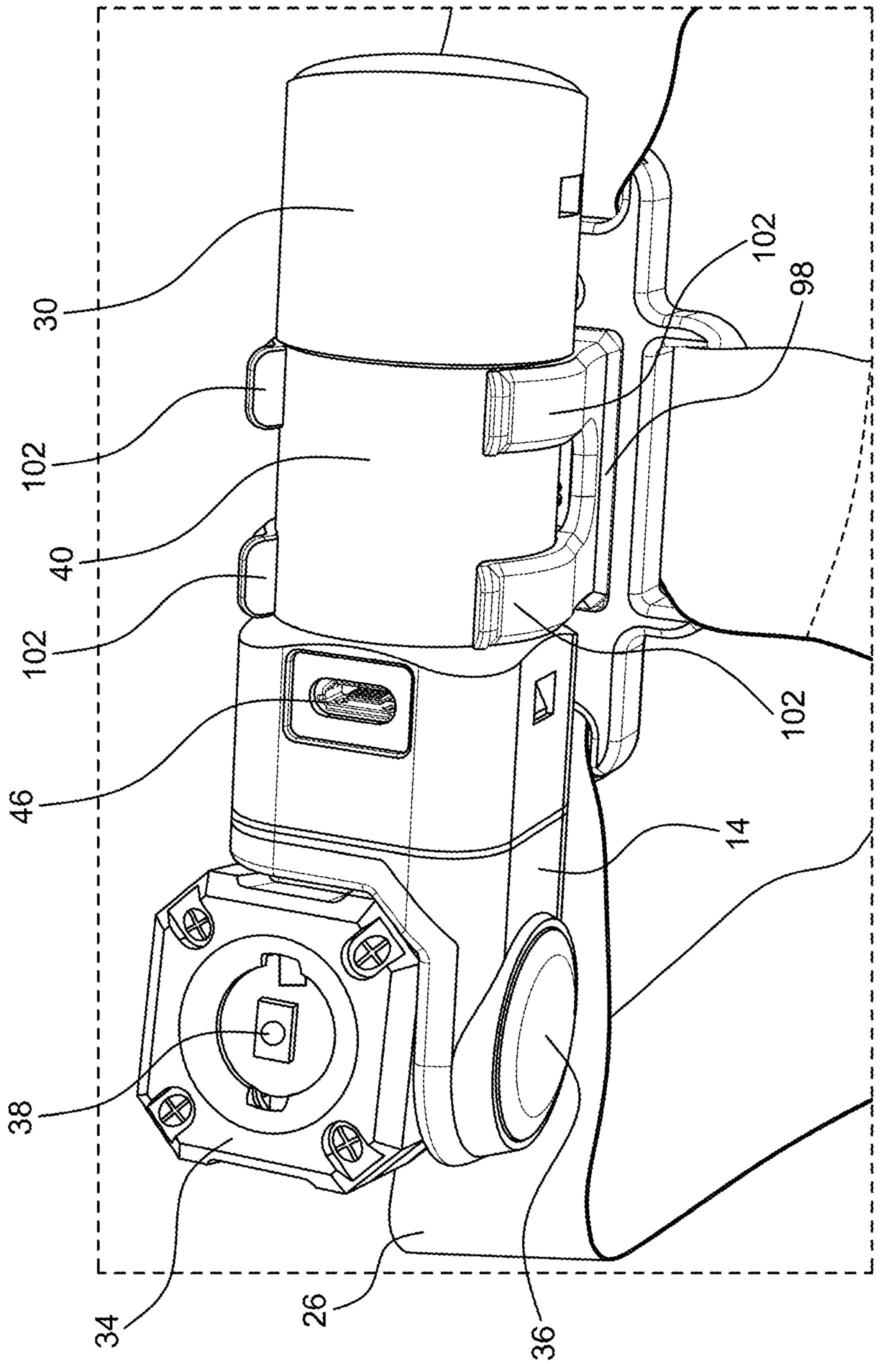
FIG. 22 is another perspective view of the mount system of FIG. 19.
Figure 23:
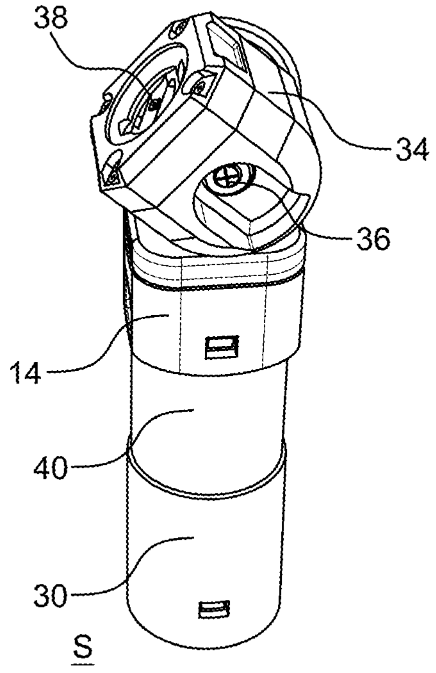
FIG. 23 is another perspective view of the mount system of FIG. 19.
Figure 24:
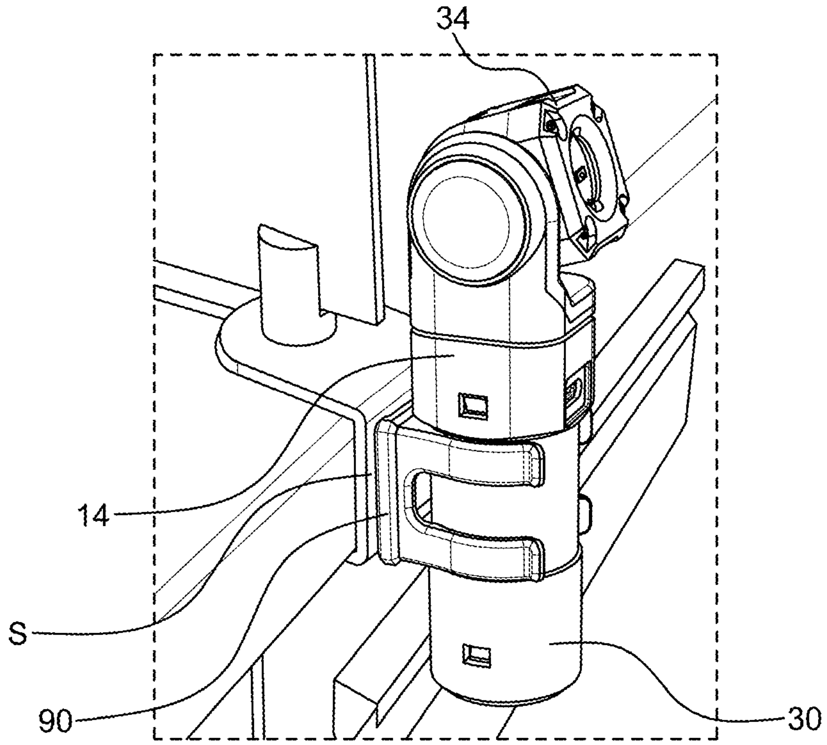
FIG. 24 is another perspective view of the mount system of FIG. 19.

FIGS. 22-24 illustrate operation of the light 14 in conjunction with the mount system 10 of FIG. 19. In FIG. 22, the c-clip 90 may be attached to the mount receiver 18 of the headband 26. The lever arms 102 may engage the reduced diameter portion 40 of the body 30. The reduced diameter portion 40 extends along a portion of the body 30 between the actuator 62 and the head 34. In the illustrated embodiment of FIG. 22, the reduced diameter portion 40 may extend between the longitudinal ends of the body 30 and does not converge with either of the longitudinal ends of the body 30. As illustrated below in FIGS. 26, 40A-41, 44, and 46, the reduced diameter portion 40 may converge with a longitudinal end of the body 30 adjacent the actuator 62.

With regards to FIG. 23, the light 14 may be supported on a surface S without engagement of the mount receiver 18 or the mount attachment 22. With regards to FIG. 24, the light 14 may be supported on a magnetic surface S. In this configuration, the lever arms 102 may engage the reduced diameter portion 40 to connect the clip 90 to the light 14, and the magnet 94 is magnetized to the magnetic surface S.

FIGS. 22-24 are examples of different modes of the mount system 10. In FIG. 22, the light 14 is secured to the mount receiver 18 by the c-clip 90. In FIG. 22, the mount receiver 18 may be provided on a headband 26. The mount receiver 18 may be otherwise provided on another structure secured to a user U (FIGS. 25A-25D) such as a belt clip, a wrist strap, a necklace, etc. The light 14 is removable from any given mount receiver 18 and is attachable to any other (e.g., a "second") mount receiver 18. FIG. 23 illustrates the light 14 as supported on the surface S without the mount receiver 18 or the mount attachment 22 connected to the light 14. Such support of the light 14 on the surface S without the mount receiver 18 or the mount attachment 22 is another option to support the light 14. Finally, FIG. 24 illustrates the light 14 engaged by the c-clip 90, with the c-clip 90 being attached to a magnetic surface S. The light 14 may be otherwise supported on a surface S that is not provided on or otherwise attached to the user U. Rather, the c-clip 90 permits mounting to any magnetic surface S. In FIG. 24, the magnetic surface S functions as the mount receiver 18, and the c-clip 90 functions as the mount attachment 22. The c-clip 90 may be otherwise replaced by another mount attachment 22 operable to secure the light to the magnetic surface S.

The mount system 10 thus provides a light 14 which can be interchangeably supported by the headband 26 or other structure secured to the user U and be supported on another structure which is not secured to the user U. The other structure not secured to the user U may be a surface S, a magnetic surface S, or any mount receiver 18 operable to engage the mount attachment 22.

Figure 25A:
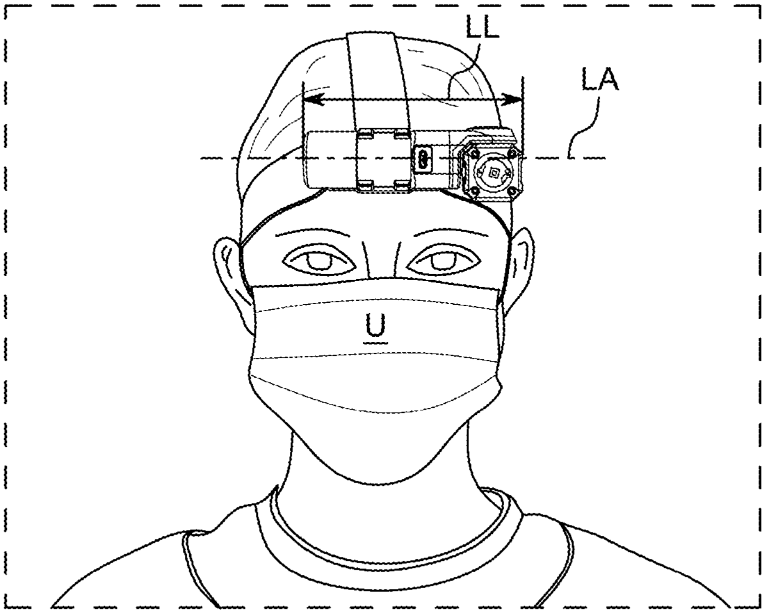
FIGS. 25A-25D illustrate the mount system of FIG. 19 as worn by a user.
Figure 25B:
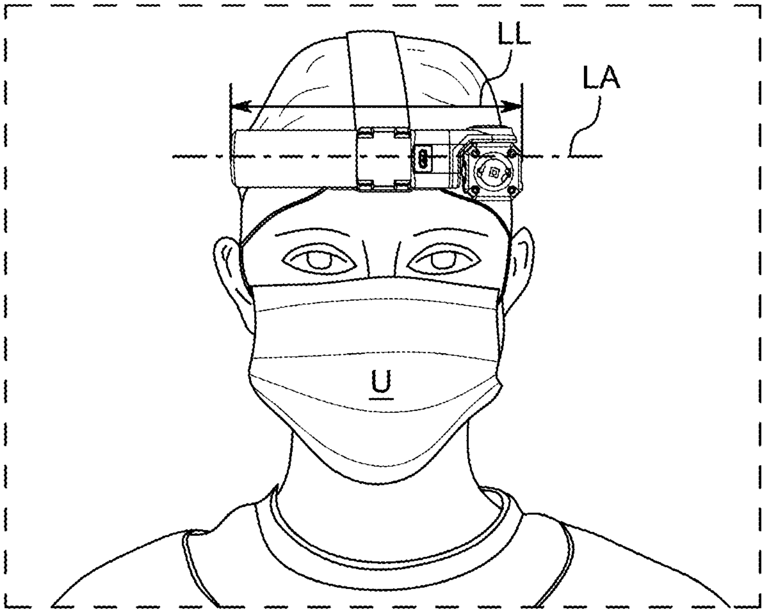
Figure 25C:
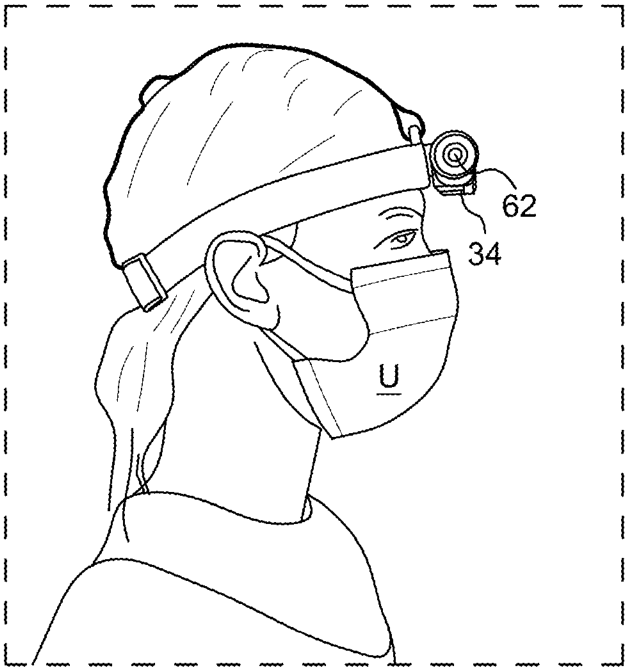
Figure 25D:
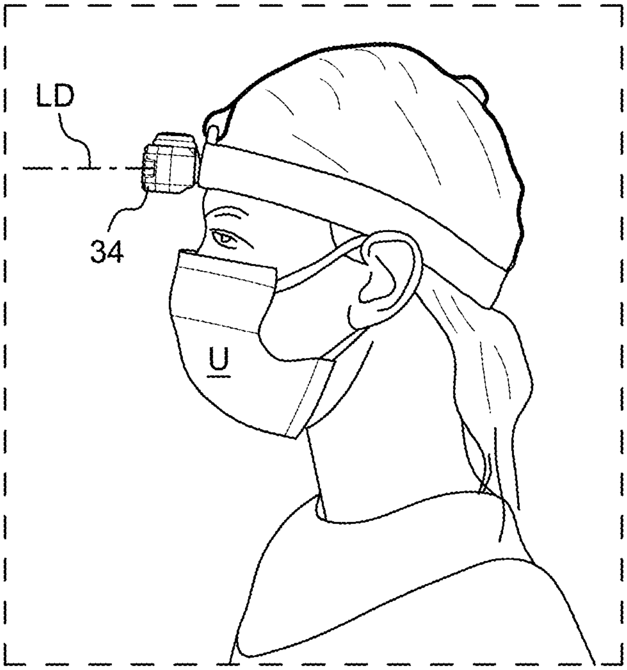
Figure 26:
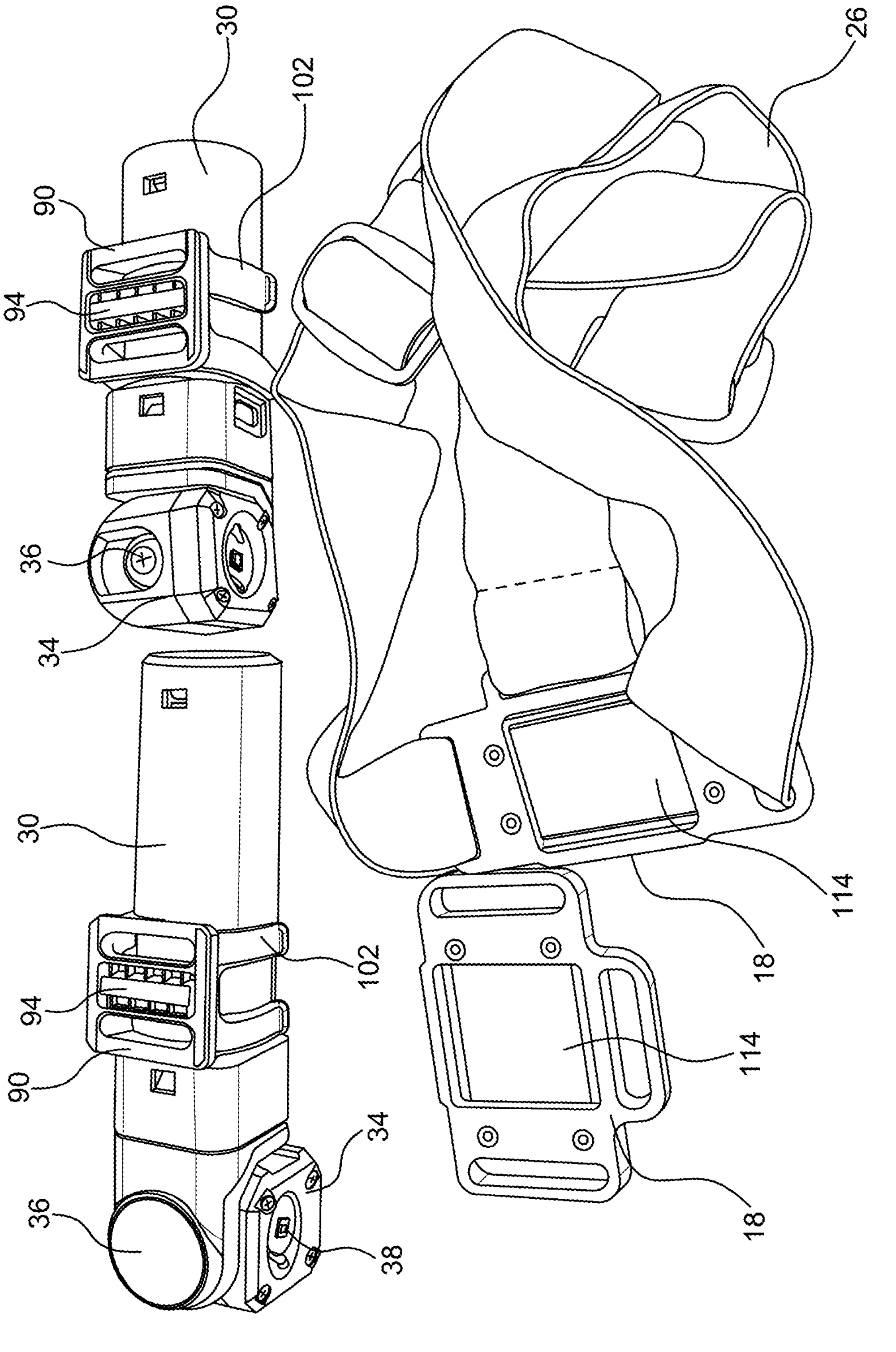
FIG. 26 is another perspective view of the mount system of FIG. 19 with the c-clip attached to the light and the mount receiver removed from the c-clip.

FIGS. 25A-25D illustrate a user U wearing the headband 26 with the light 14 secured to the receiver 18 of the headband 26 by the c-clip 90. FIG. 25A illustrates a light 14 of a first longitudinal length, and FIG. 26 illustrates a light 14 of a second longitudinal length longer than the first longitudinal length. As best shown in FIG. 25D, the light direction LD of light emitted by the light emitting element 38 extends away from the user U.

FIG. 26 illustrates the mount system 10 with the aforementioned lights 14 and c-clip 90. The c-clip 90 may be sized to correspond with the mount receiver 18 of the headband 26. The c-clip 90 may be commonly sized for each light 14 so the c-clip 90 can engage reduced diameter portions 40 of different lights 14 interchangeably.

Figure 27:
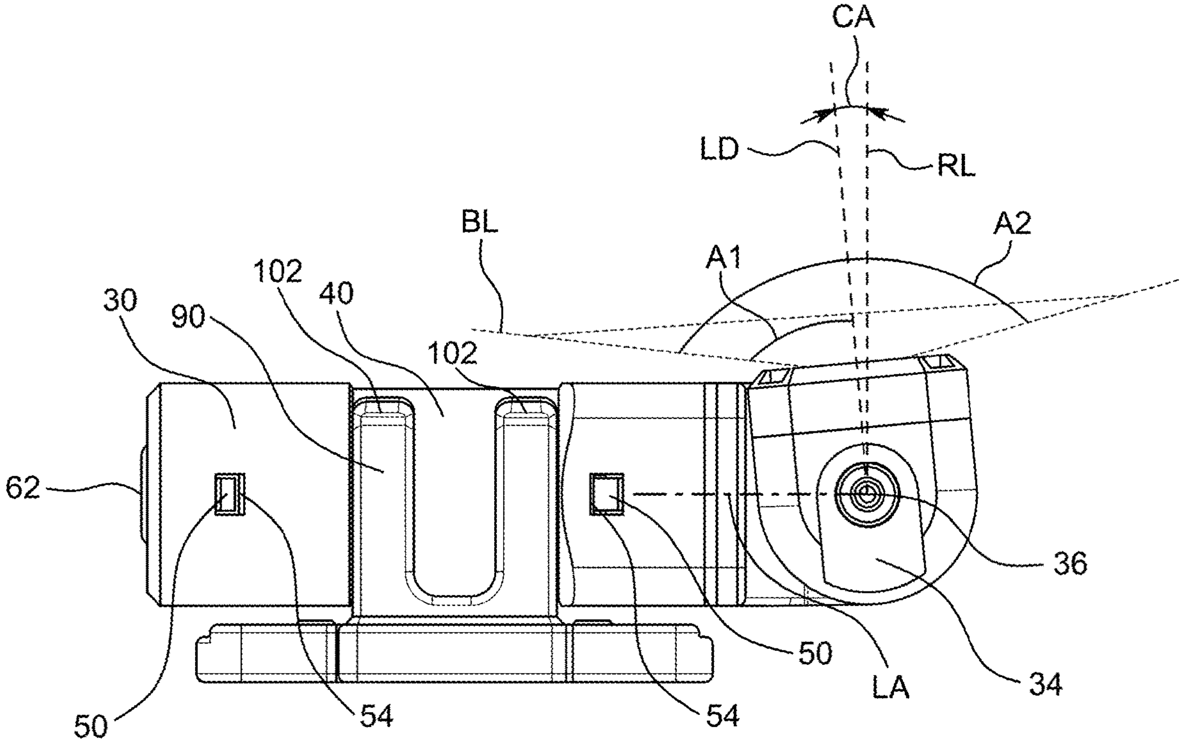
FIG. 27 is a top view of the light and the mount attachment of FIG. 19 with the light illuminated.
Figure 28:
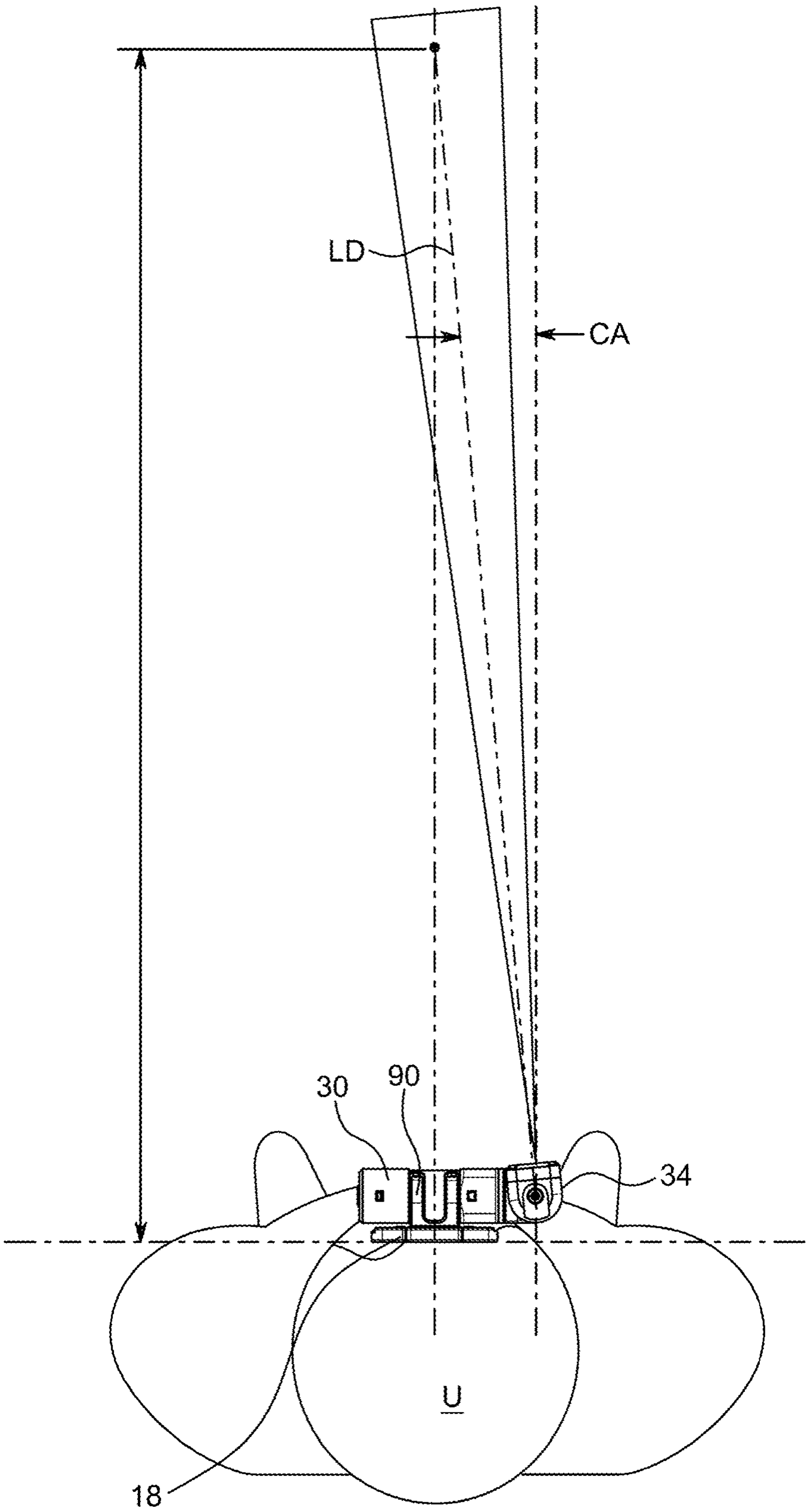
FIG. 28 is another top view of the light and the mount attachment of FIG. 19 with the light illuminated.

FIGS. 27 and 28 illustrate the head 34 pointing along a light direction LD that extends beyond a reference line RL which is perpendicular to the longitudinal axis LA. In FIGS. 27 and 28, the light direction LD may extend at a correction angle CA beyond the reference line RL. The correction angle CA may be between 1 degree and 10 degrees. In the illustrated embodiment, the correction angle CA may be about 5 degrees. The correction angle CA may adjust the light direction LD such that a light cone emitted by the light emitting element 38 shines directly in front of the user U when the light 14 is secured on the headband 26 and the head 34 is offset from directly in front of the user U.

Figure 29:
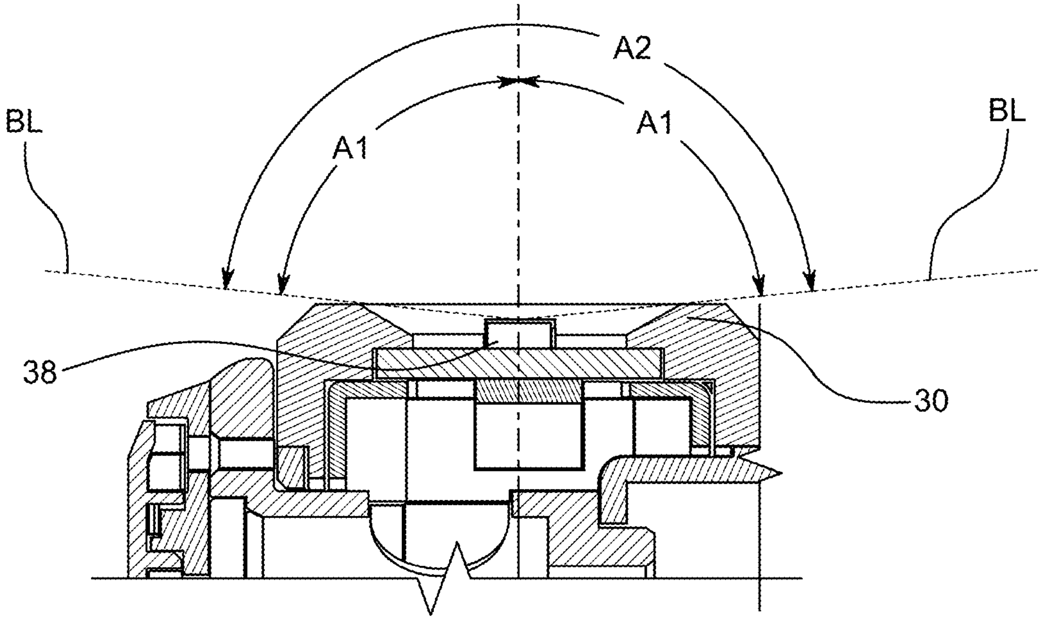
FIG. 29 is another top view of the light of FIG. 27 illustrating the bounds of the beam generated by the light.
Figure 30:
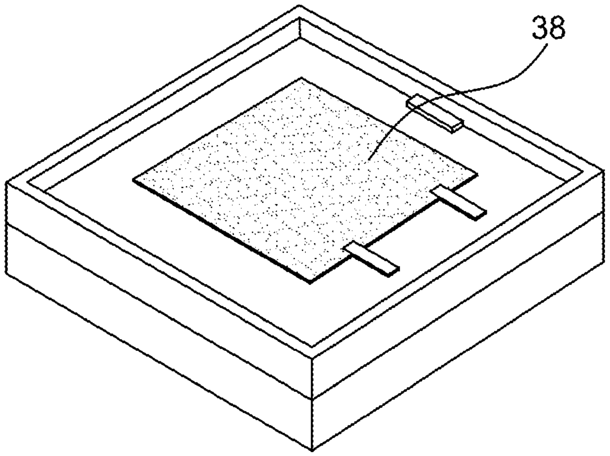
FIG. 30 is a perspective view of an exemplary light emitting diode for use within the light.
Figure 31:
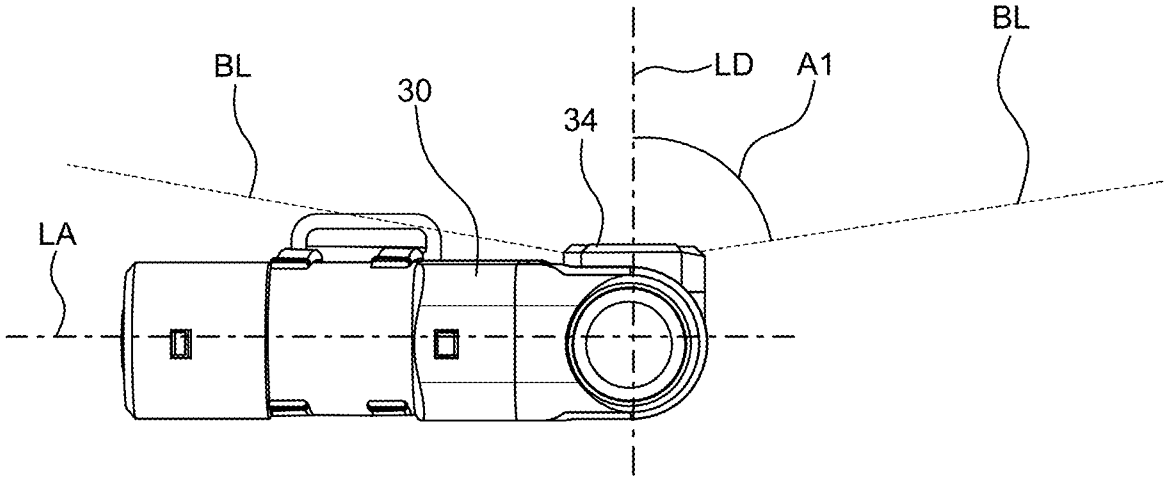
FIG. 31 is another top view of the light of FIG. 27 illustrating the bounds of the beam generated by the light.

FIGS. 29 and 30 illustrate an exemplary head 34 and light emitting element 38. As shown in FIG. 29, the light emitting element 38 may emit light along a light cone having a light cone angle A1. The light cone angle A1 may be between 7 and 85 degrees. A double light cone angle A2 may be measured between the boundary line BL of the light cone emitted by the light emitting element, extend through the light direction LD, and meet the boundary light BL of the light cone opposite the original boundary line BL. In other words, the double light cone angle A2 may include two of the light cone angles A1. In the illustrated embodiment, the boundary lines BL may be bounded by the head 34. In the illustrated embodiment, the double light cone angle A2 may be between 100 and 175 degrees. In the illustrated embodiment, the double light cone angle A2 may be about 167 degrees, and the light cone angle A1 may be about 83.5 degrees. The double light cone angle A2 may also depend on the intensity of the light emitting element 38. For example, lower intensity light emitting elements 38 may have boundary lines BL which are not bounded by the head 34, but are rather bounded by the emission of light from the light emitting element 38.

FIG. 30 illustrates an exemplary light emitting element 38. The exemplary light emitting element 38 may be a Cree XLmp XP-L high intensity V2-1A LED. The exemplary light emitting element 38, when operating at half intensity, may have a double light cone angle A2 of about 115 degrees. Other light emitting elements 38 may have double light cone angles A2 of about 125 degrees. In some embodiments, the light emitting element 38 may include one or more additional LEDs to increase the light cone angle. The one or more additional LEDs may also have a different color (e.g., red).

Figure 34:
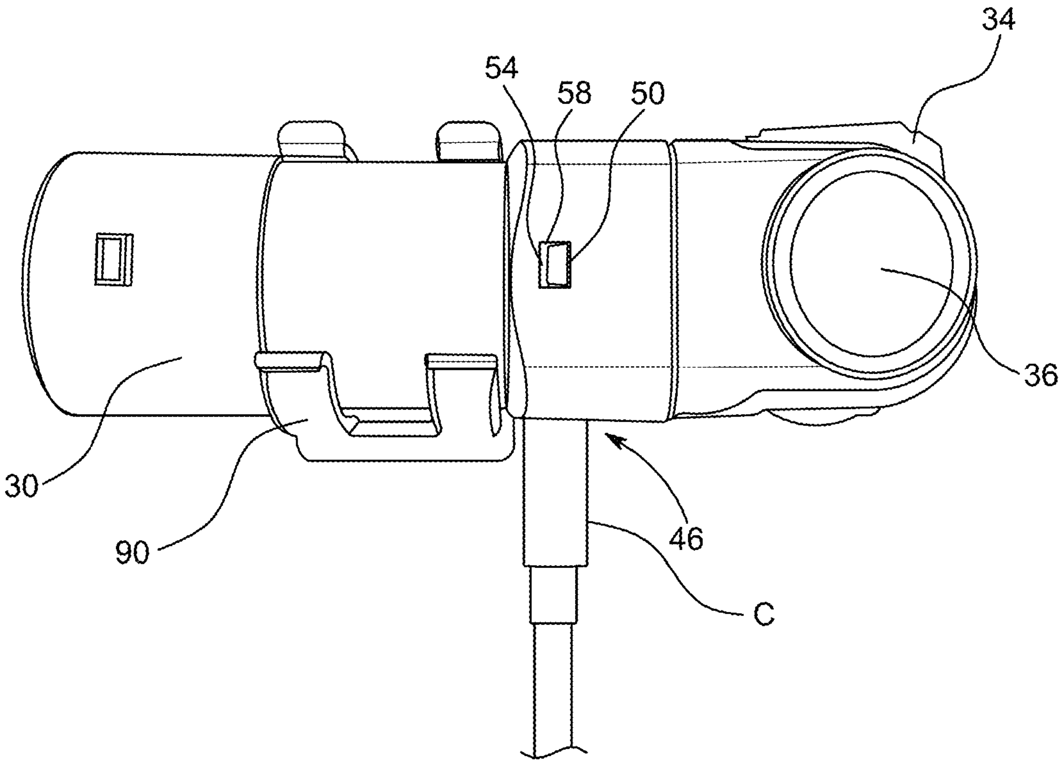
FIG. 34 is a second side view of the light of FIG. 11 with a battery indicator light within the body illuminated.

With reference again to FIGS. 33 and 34, the light 14 may include the snap openings 50 with apertures 54 for permitting passage of light generated by the charge indicator light 58 therethrough. As shown in FIG. 34, the cable C engages the charging port 46 adjacent the charge indicator light 58. In the illustrated embodiment, the charging port 46 may be spaced from the reduced diameter portion 40 such that the c-clip 90 can engage the light 14 during charging. The charge indicator light 58 thus is not obstructed by the c-clip 90 or the cable C during charging even while the c-clip 90 engages on a surface S.

Figure 35A:
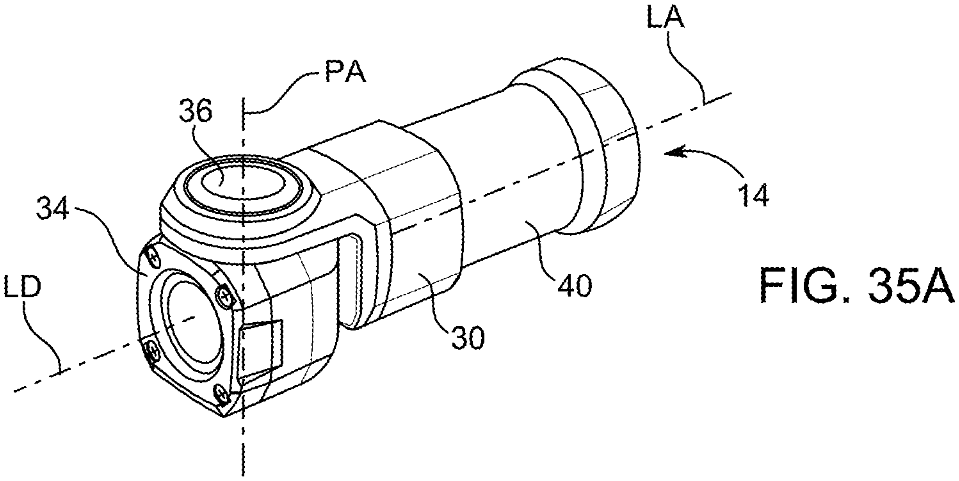
FIGS. 35A-35C illustrate a mount system including a light, a mount attachment, and a mount receiver.
Figure 35B:
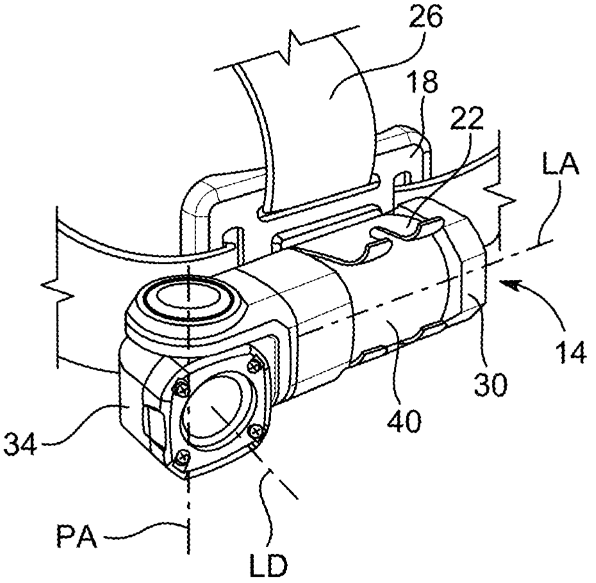
Figure 35C:
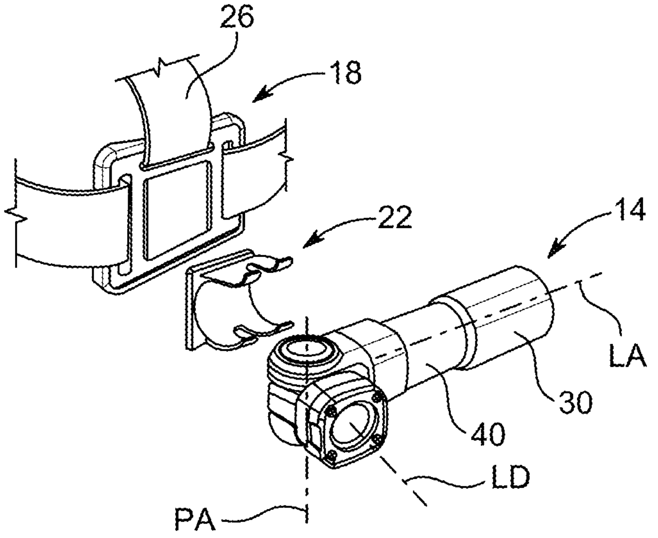
Figure 36A:
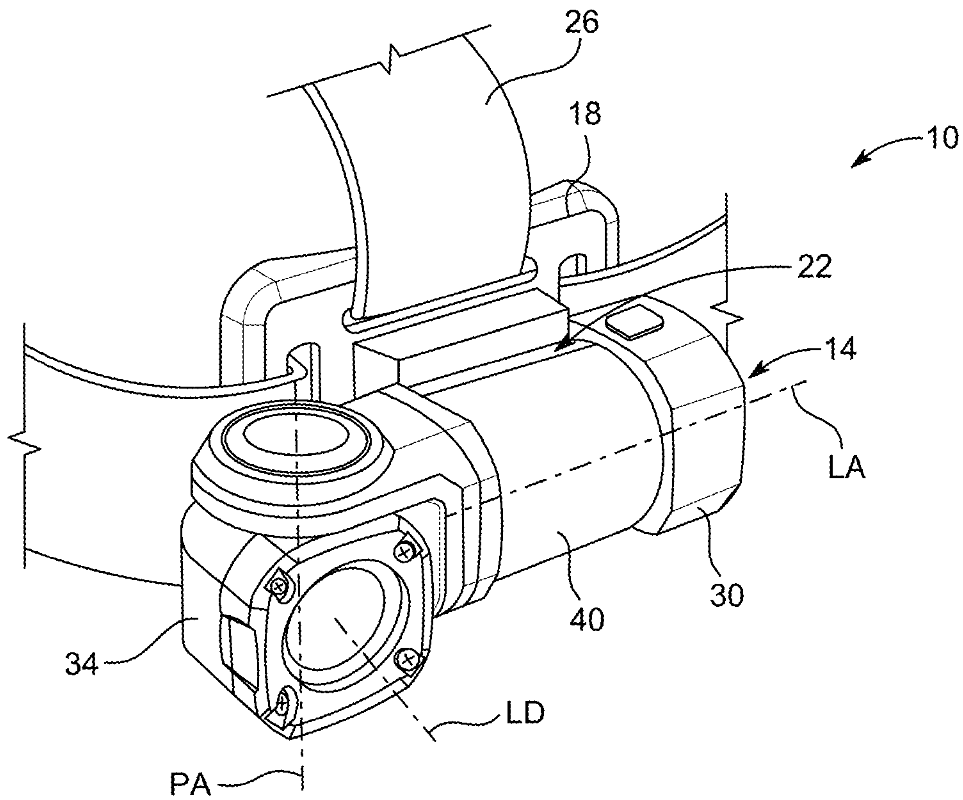
FIGS. 36A and 36B illustrate a mount system including a light provided with a mount attachment and a mount receiver.
Figure 36B:
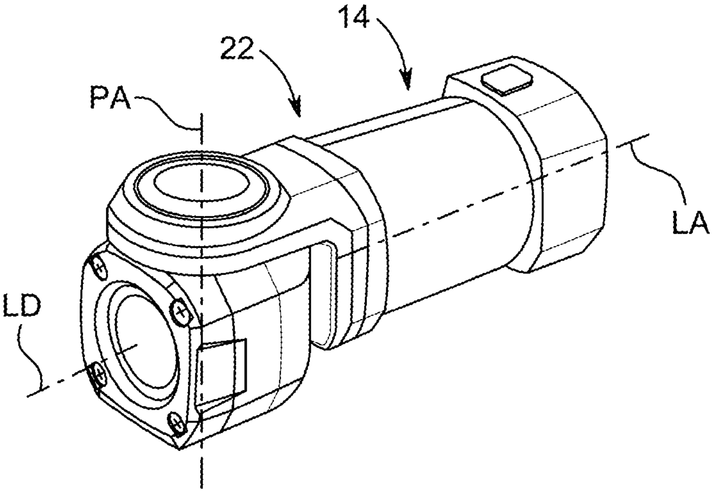
Figure 37A:
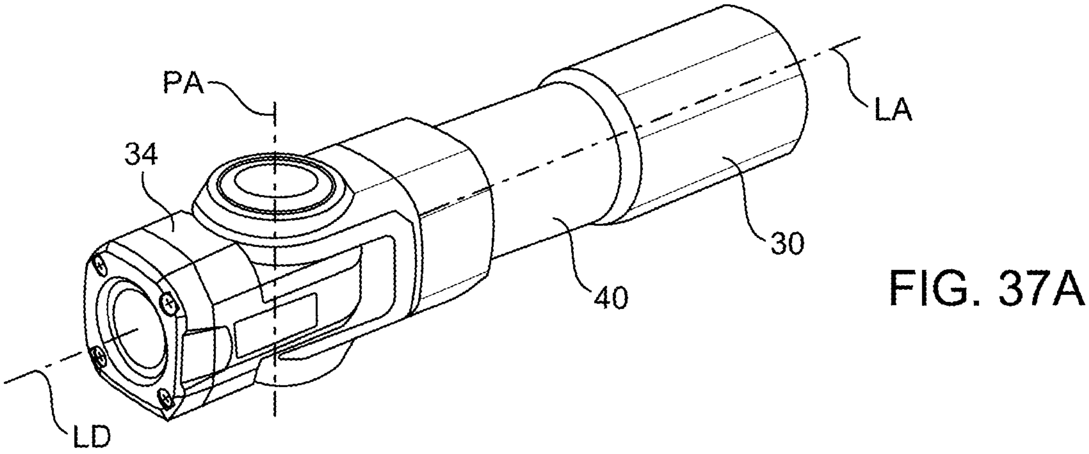
FIGS. 37A-37C illustrate a mount system including a light, a mount attachment, and a mount receiver.
Figure 37B:
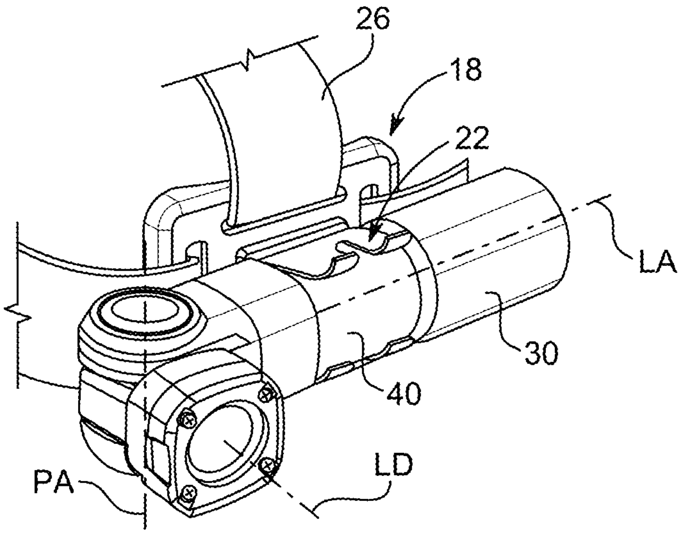
Figure 37C:
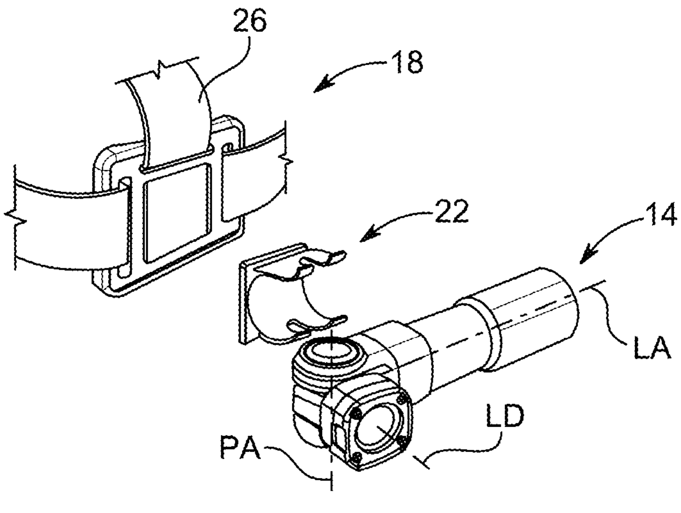
Figure 38A:
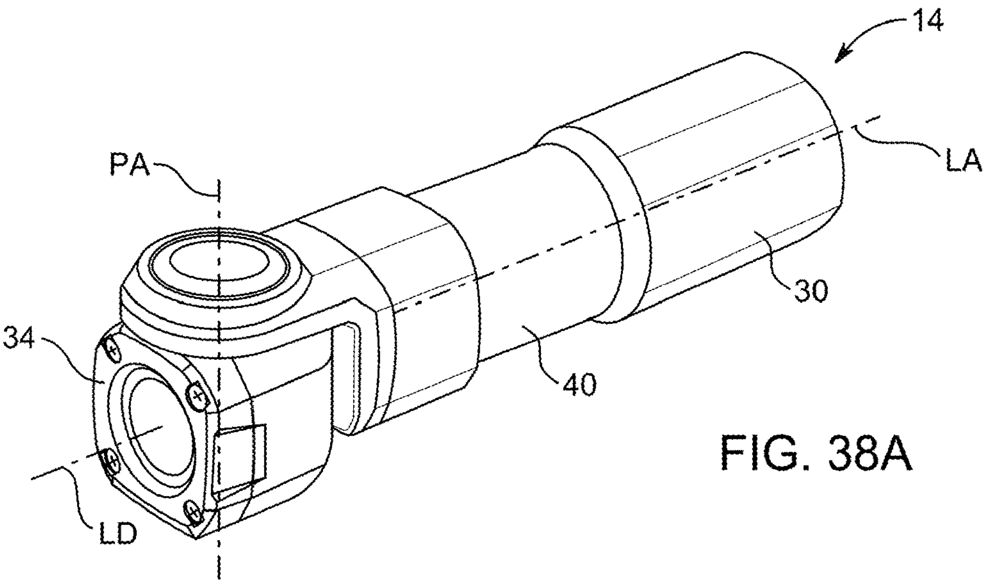
FIGS. 38A-38C illustrate a mount system including a light, a mount attachment, and a mount receiver.
Figure 38B:
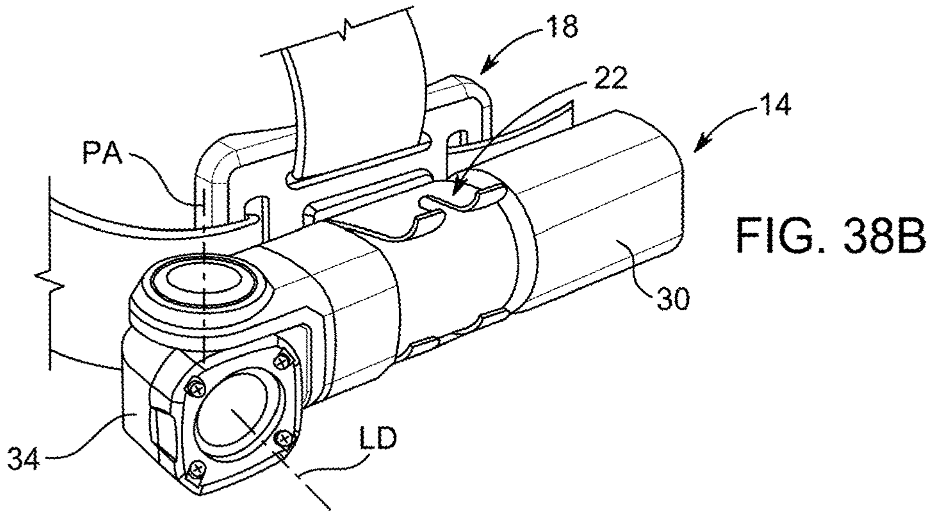
Figure 38C:
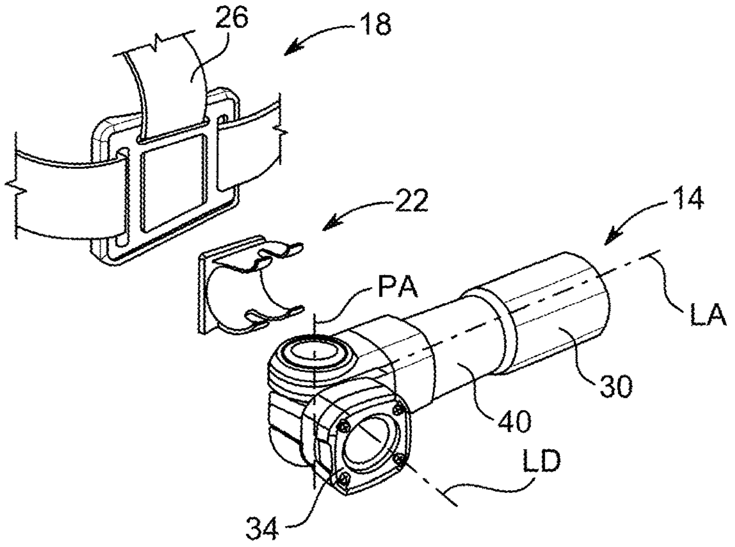
Figure 39A:
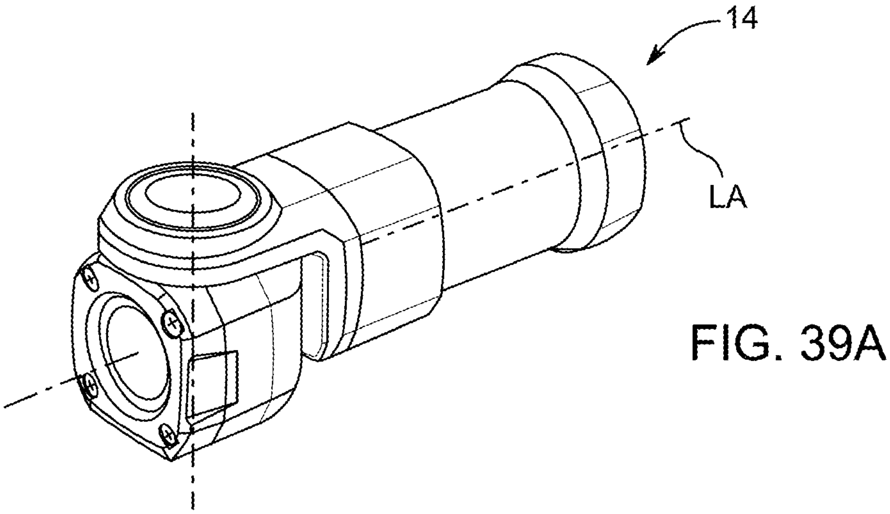
FIGS. 39A-39C illustrate a mount system including a light, a mount attachment, and a mount receiver.
Figure 39B:
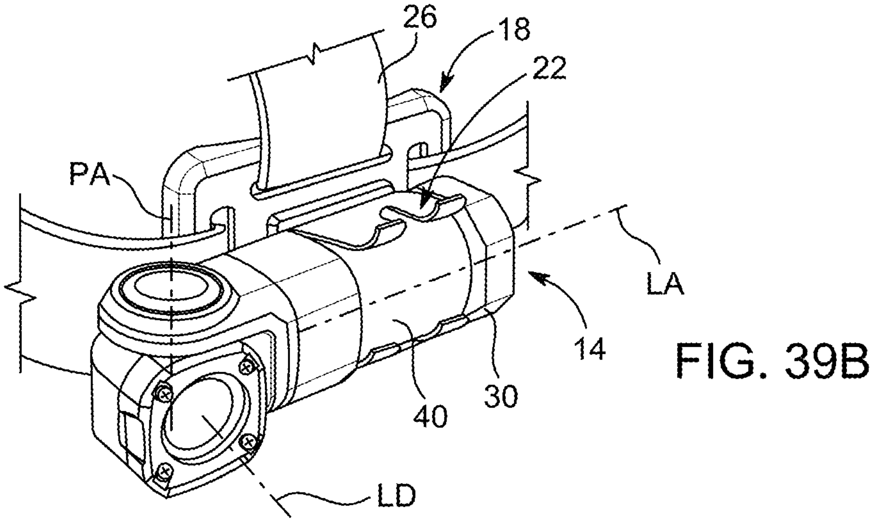
Figure 39C:
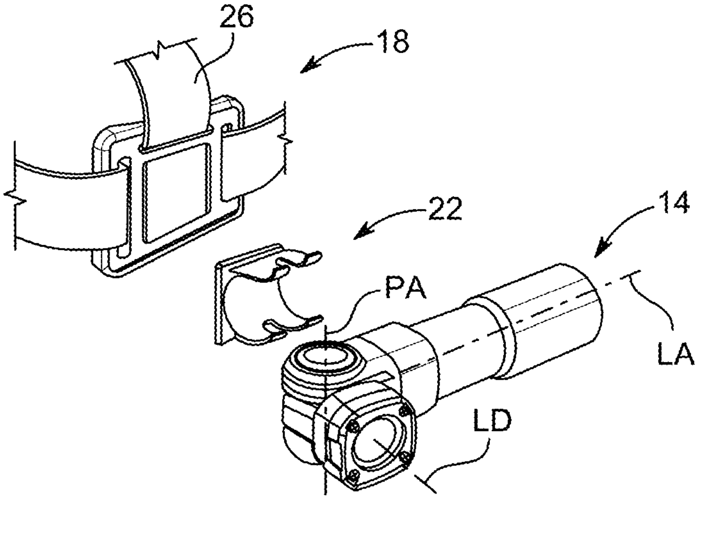
Figure 40A:
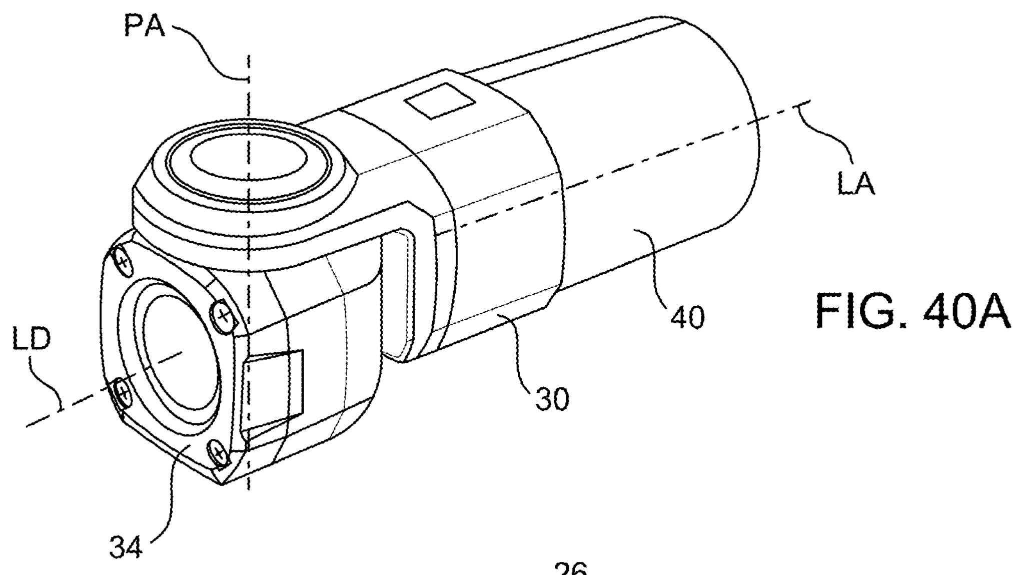
FIGS. 40A-40C illustrate a mount system including a light, a mount attachment, and a mount receiver.
Figure 40B:
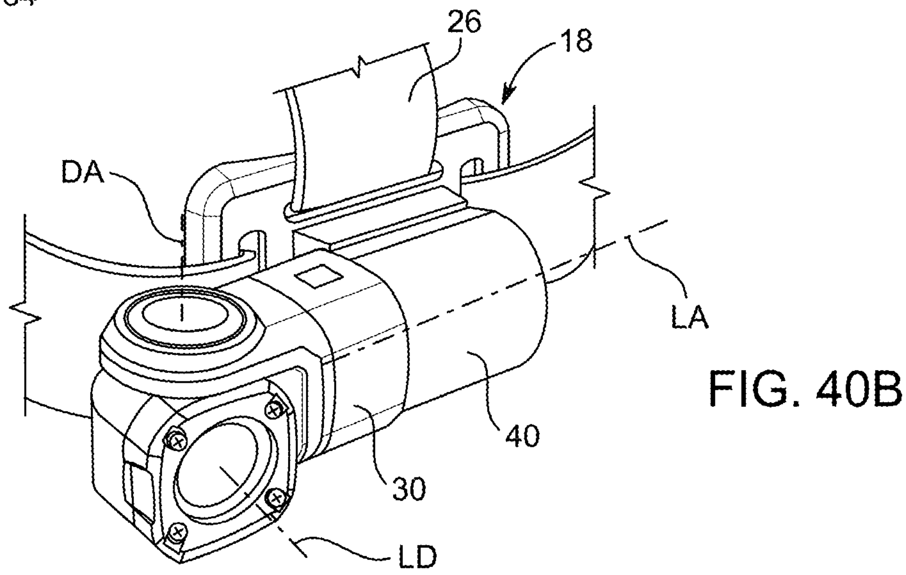
Figure 40C:
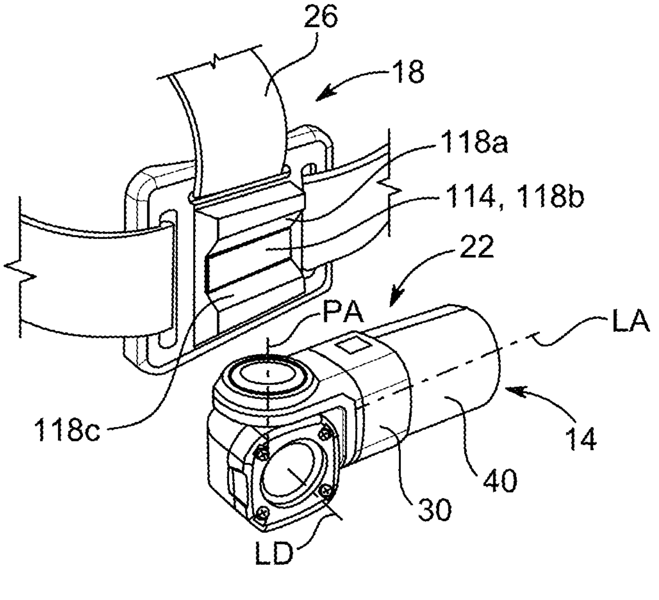
Figure 41:
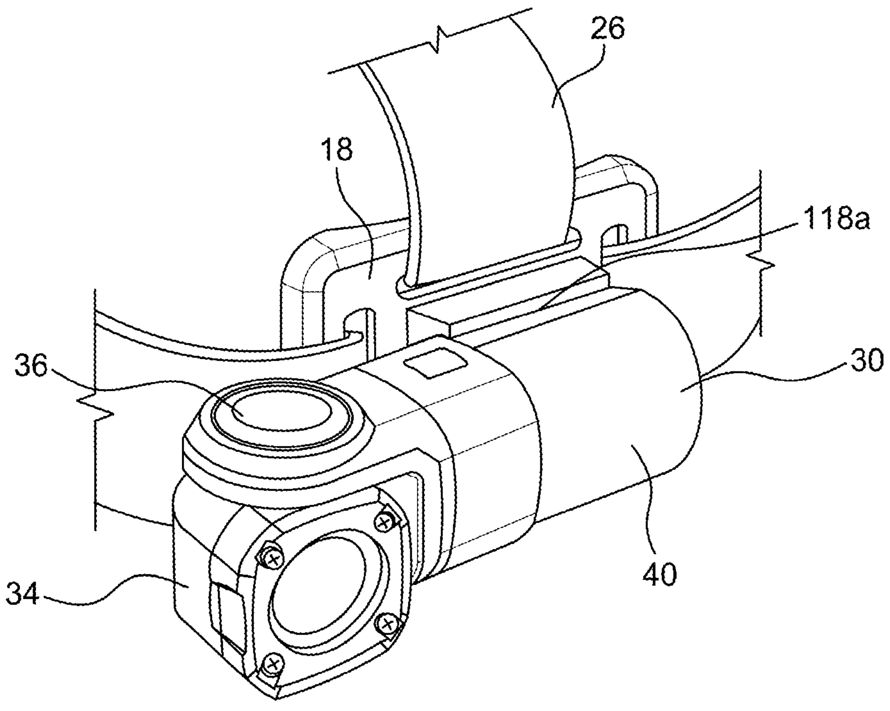
FIG. 41 illustrates a mount system including a light, a mount attachment, and a mount receiver.
Figure 42:
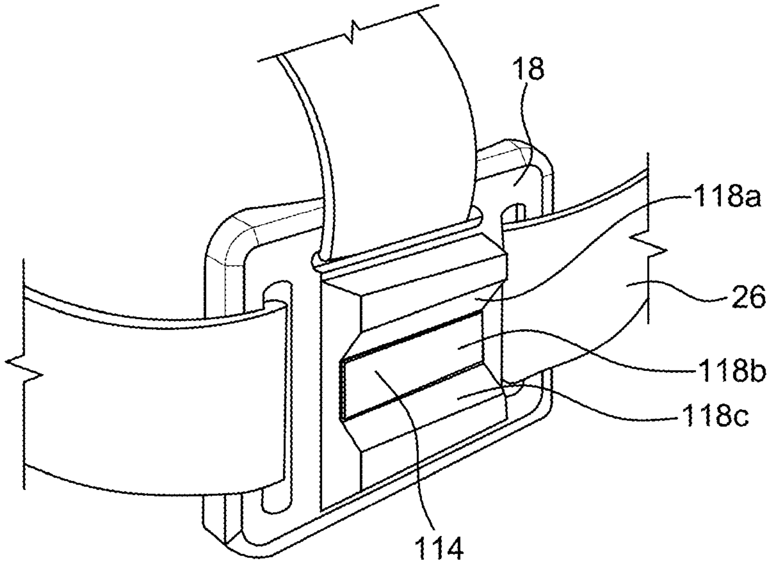
FIG. 42 illustrates a mount receiver.

With reference to FIGS. 35A-35C, 37A-37C, and 38A-38C, the mount system 10 includes a separate c-clip 90 operating as a mount attachment 22 to engage both the mount receiver 18 of the headband 26 and the light 14. FIGS. 35A-35C illustrate a light 14 having a longitudinal length LL of about 151 millimeters. FIGS. 37A-37C illustrate a light 14 having a longitudinal length LL of about 134 millimeters. FIGS. 38A-38C illustrate a light 14 having a longitudinal length LL of about 94 millimeters. FIGS. 36A and 36B as well as FIG. 41 illustrate a mount system 10 including a light 14 having a longitudinal length LL of about 94 millimeters.

Figure 43A:
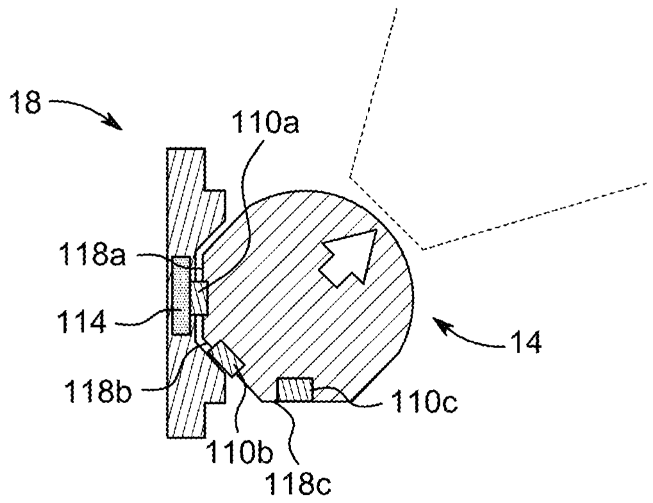
FIGS. 43A-43C illustrate mounting positions of the light and mount attachment relative to the mount receiver of FIGS. 40A-40C.
Figure 43B:
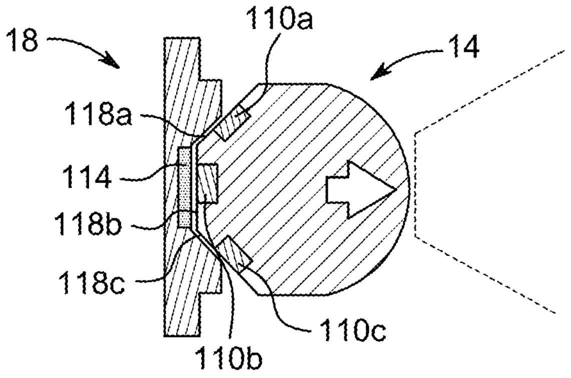
Figure 43C:
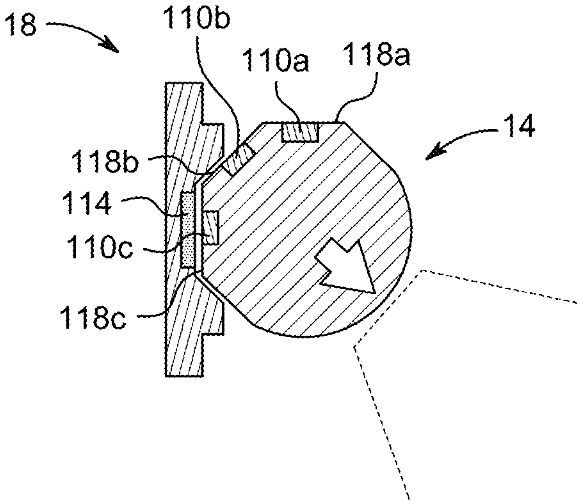

In the mount system 10 of FIGS. 36A, 36B, and 41-51C, the mount attachment 22 may be provided integrally with the body 30 of the light 14. The mount attachment 22 in these embodiments of the mount system 10 may include a magnet 110*a*-110*c* (e.g., a light magnet, illustrated as each of 110*a*-110*c*) provided on the body 30 of the light 14. The magnet 110*a*-110*c* may be magnetically coupled to the magnet 114 (e.g., a mount magnet 114) of the mount receiver 18. As best illustrated in FIGS. 43A-43C, the light 14 may include three magnets 110*a*-110*c* each arranged on a corresponding respective planar surface 118*a*-118*c* of the body 30. The planar surfaces 118*a*-118*c* may be provided on the exterior of the body 30 and may be angled relative to each other. In the illustrated embodiment, the planar surfaces 118*a*-118*c* may be angled at 45 degree increments relative to each other. The planar surfaces 118*a*-118*c* may be otherwise angled relative to each other. For example, the planar surfaces 118*a*-118*c* may be angled at 15 degrees, 30 degrees or any other desired increment. Accordingly, the light 14 may be magnetically coupled to the mount receiver 18 in a first orientation (e.g., as illustrated in FIG. 43A) relative to the mount receiver 18, and may be removed from the mount receiver 18 to be coupled in a second orientation different than the first orientation (e.g., as illustrated in FIG. 43B).

Figure 44:
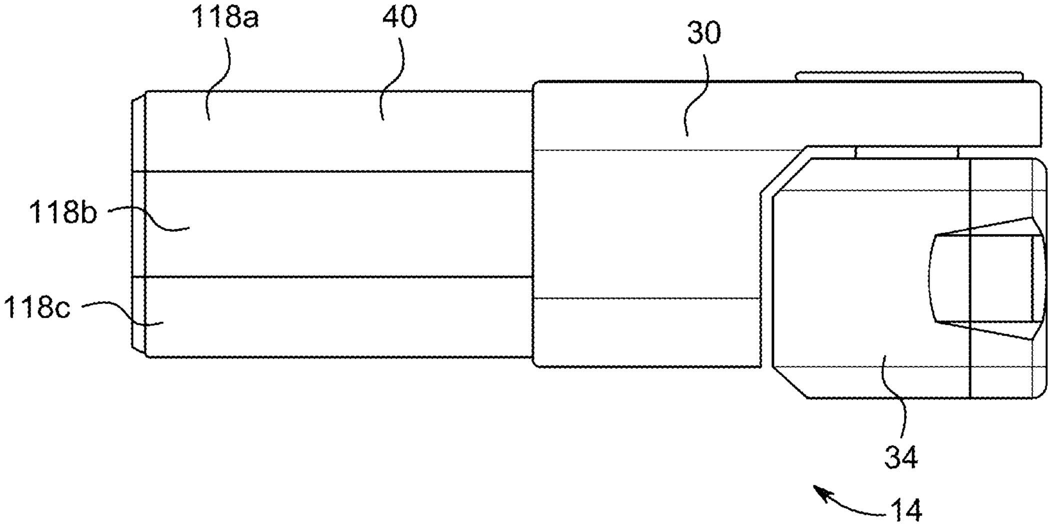
FIG. 44 illustrates a side view of the light of FIG. 41.
Figure 45:
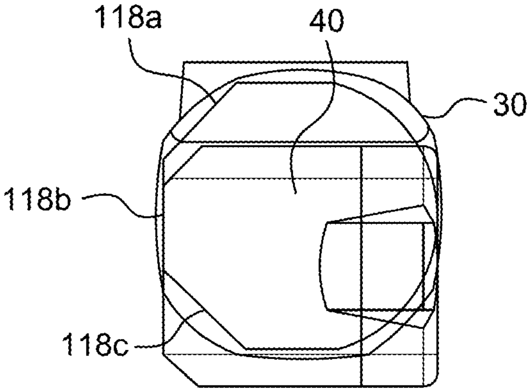
FIG. 45 illustrates an end view of the light of FIG. 41.

With reference to FIGS. 43A-43C and FIGS. 51A-51C, while the light 14 is secured to the mount receiver 18, the light emitted by the light emitting element 38 may be emitted along a light direction LD which corresponds with the connection between one of the magnets 110*a*-110*c* and the magnet 114. In the illustrated embodiments, the light direction LD may extend perpendicular to the mount receiver 18 in FIGS. 43B and 11B, 45 degrees upward relative to the mount receiver 18 in FIGS. 43A and 51A, and 45 degrees downward relative to the mount receiver 18 in FIGS. 43C and 51C. FIGS. 44 and 45 further illustrate the planar surfaces 118*a*-118*c*. As shown in FIG. 44, the planar surfaces 118*a*-118*c* may be provided on the reduced diameter portion 40, and the reduced diameter portion 40 may extend to the end of the body 30 adjacent the actuator 62.

Figure 46:
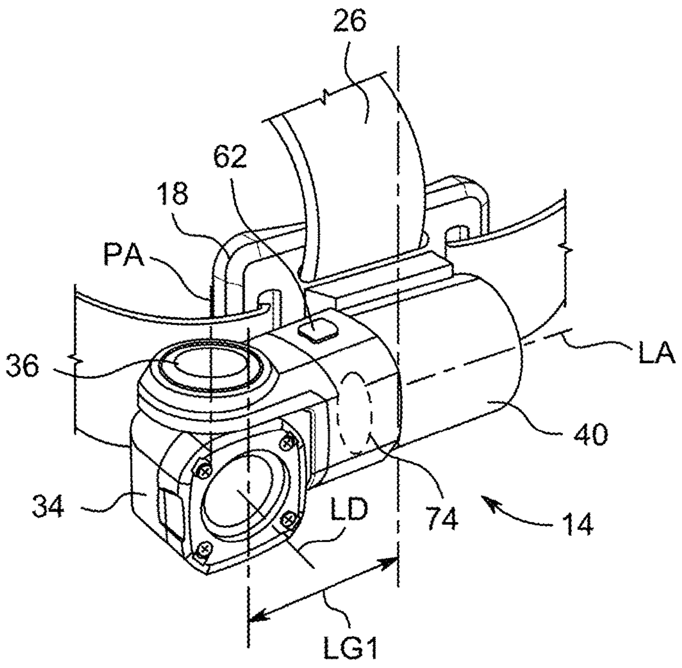
FIG. 46 is a perspective view of the mount system of FIG. 40B.
Figure 47A:
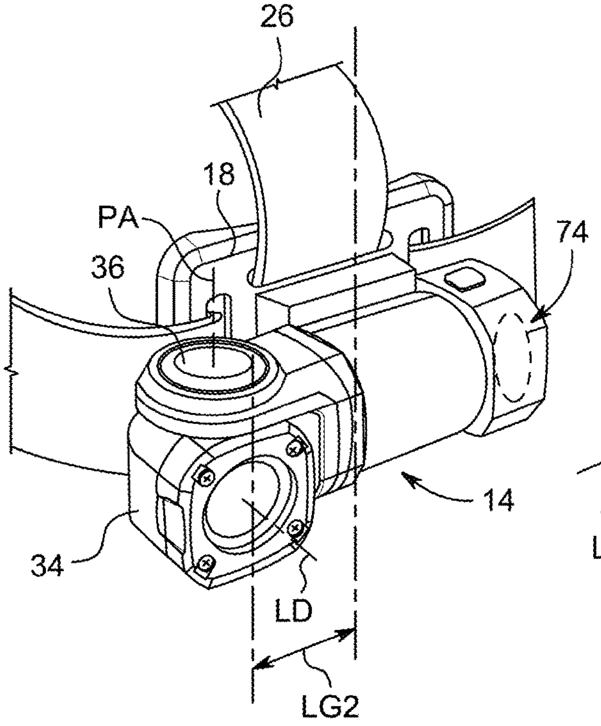
FIG. 47A is a perspective view of the mount system of FIG. 36A.
Figure 47B:
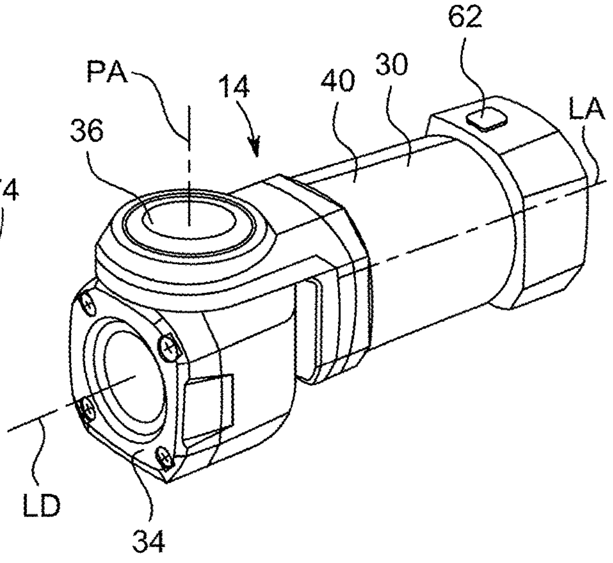
FIG. 47B is a perspective view of the light of the mount system of FIG. 36A.
Figure 48:
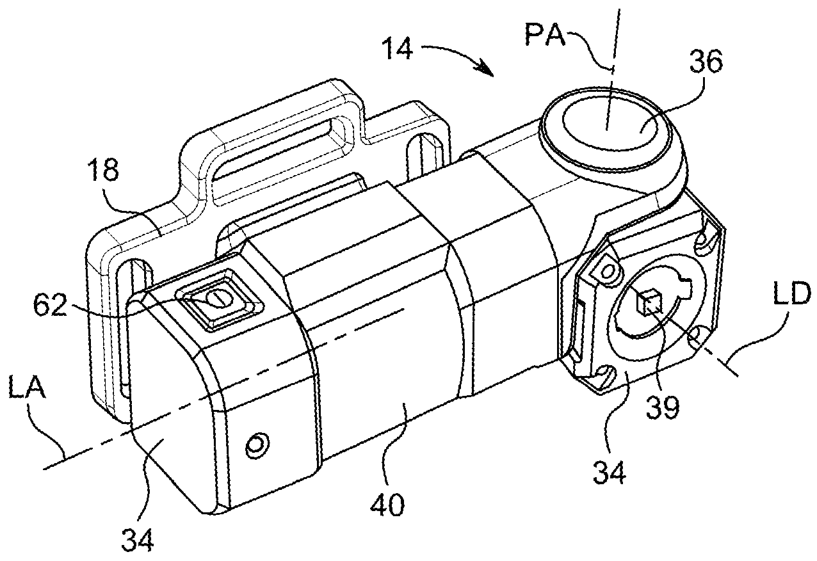
FIG. 48 is a perspective view of another mount system including a light having a mount attachment and a separate mount receiver.
Figure 49A:
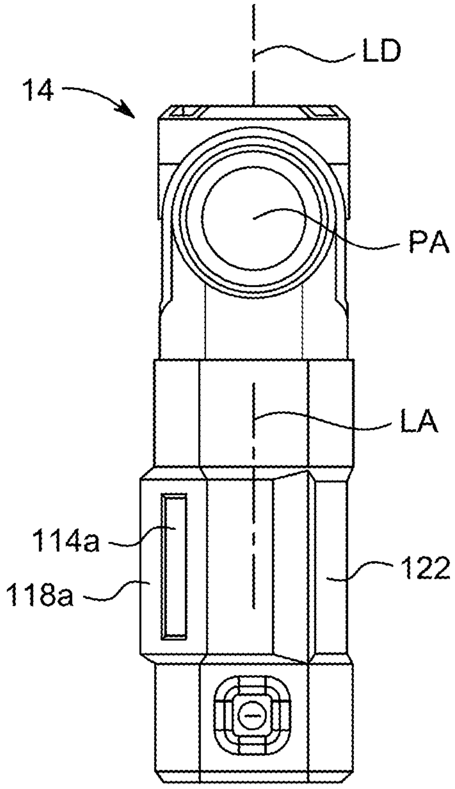
FIG. 49A is an end view of the light of FIG. 48.
Figure 49B:
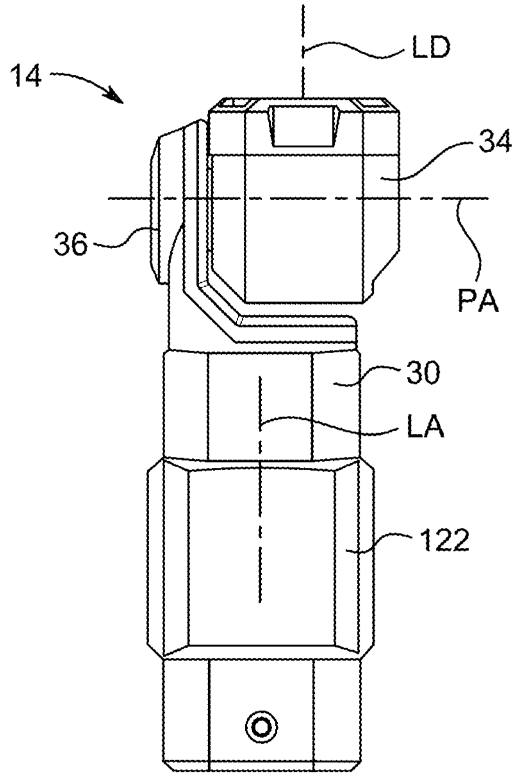
FIG. 49B is a side view of the light of FIG. 48.
Figure 49C:
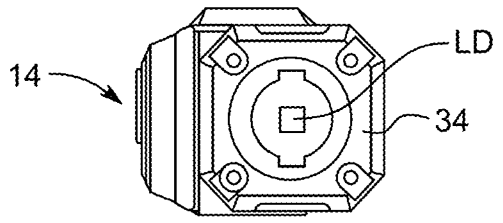
FIG. 49C is a top view of the light of FIG. 48.
Figure 50A:
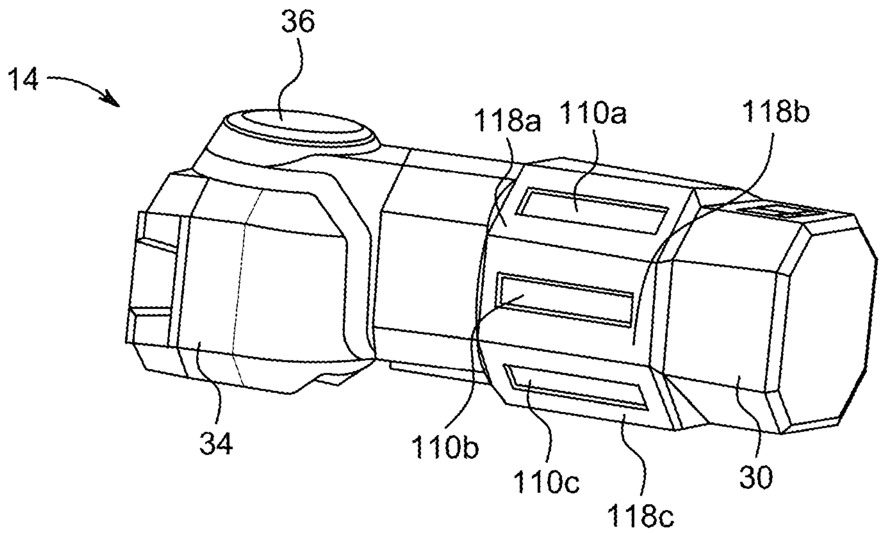
FIG. 50A is a perspective view of the light of FIG. 48.
Figure 50B:
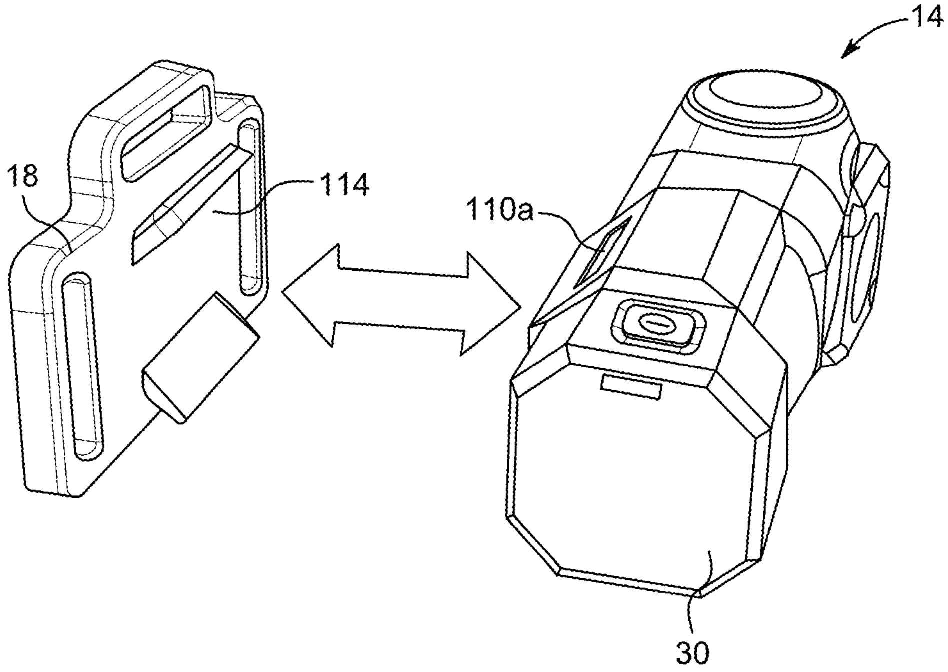
FIG. 50B is a perspective view of the mount system of FIG. 48.

FIGS. 46-47B illustrate the light 14 with the magnet 110 engaging the magnet 114. In the embodiment of FIG. 46, a longitudinal gap LG1 between the center of the mount receiver 18 and the hinge 36 may be a first distance. The control board 74 may be located adjacent the head 34. In the embodiment of FIG. 46, the actuator 62 may be provided on a side surface of the body 30 between the head 34 and the opposite longitudinal side of the body 30. In the embodiment of FIGS. 47A and 47B, a longitudinal gap LG2 between the center of the mount receiver 18 and the hinge 36 may be a second distance. The second distance may be less than the first distance. The control board 74 may be located within the body 30 and adjacent the longitudinal side of the body 30 opposite the head 34. Such a reduced longitudinal gap LG 2 lessens the need for the correction angle CA and locates the center of gravity of the light 14 closer to the center of the mount receiver 18.

FIGS. 48-50B further illustrate the mount system 10 with an adjusted diameter portion 122 that bridges the planar surfaces 118*a*-118*c* with the remainder of the body 30. The body 30 of the mount system 10 in FIGS. 48-50B may not be perfectly cylindrical, and the adjusted diameter portion 122 may extend along the longitudinal axis LA between the head 34 and the opposite end of the body 30 adjacent the actuator 62.

Figure 51A:
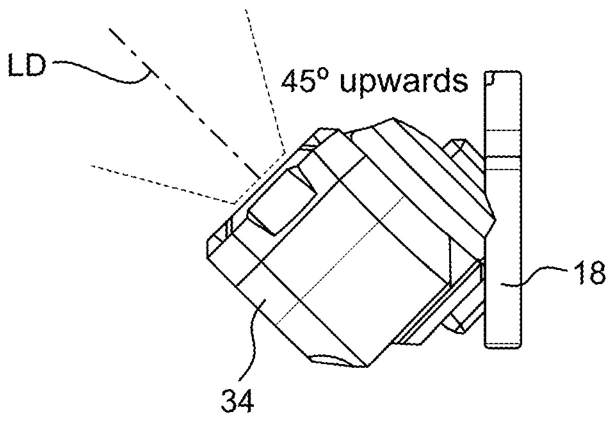
FIGS. 51A-51C are side views of the mount system of FIG. 48 with the light illuminated.
Figure 51B:
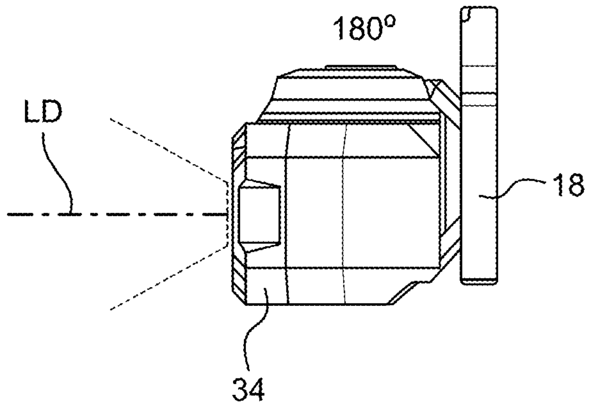
Figure 51C:
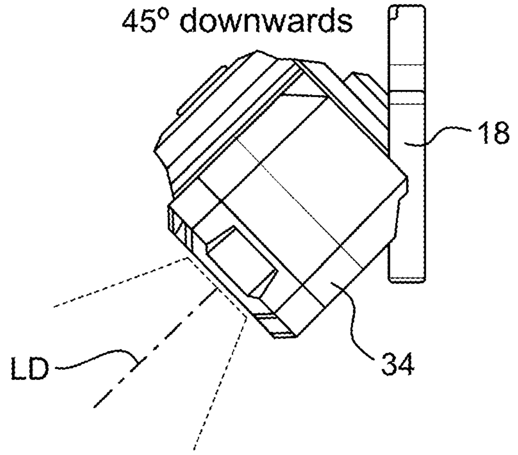

FIGS. 51A-51C illustrate multiple orientations of the head 34 and thus the light direction LD when the light 14 is mounted on the mount receiver 18. In FIG. 51B, the light direction LD is generally perpendicular to the mount receiver 18. In FIG. 51A, the light direction LD extends approximately 45 degrees upwardly from perpendicular to the mount receiver 18 (e.g., with reference to FIG. 51B). In FIG. 51C, the light direction LD extends approximately 45 degrees downwardly from perpendicular to the mount receiver 18 (e.g., with reference to FIG. 51B). Other arrangements and orientations (e.g., angles relative to perpendicular to the mount receiver 18) are possible. FIGS. 51A-51C generally illustrate the utilization of the magnets 110*a*-110*c* as they engage the mount magnet 114. Similar orientations may be achieved, for example, by the embodiments including mount attachments 22 in the form of the clip 90. For example, as illustrated in FIG. 35B, the light 14 may be rotated about the longitudinal axis LA to orient the light direction LD at a desired angle relative to perpendicular to the mount receiver 18.

Figure 52:
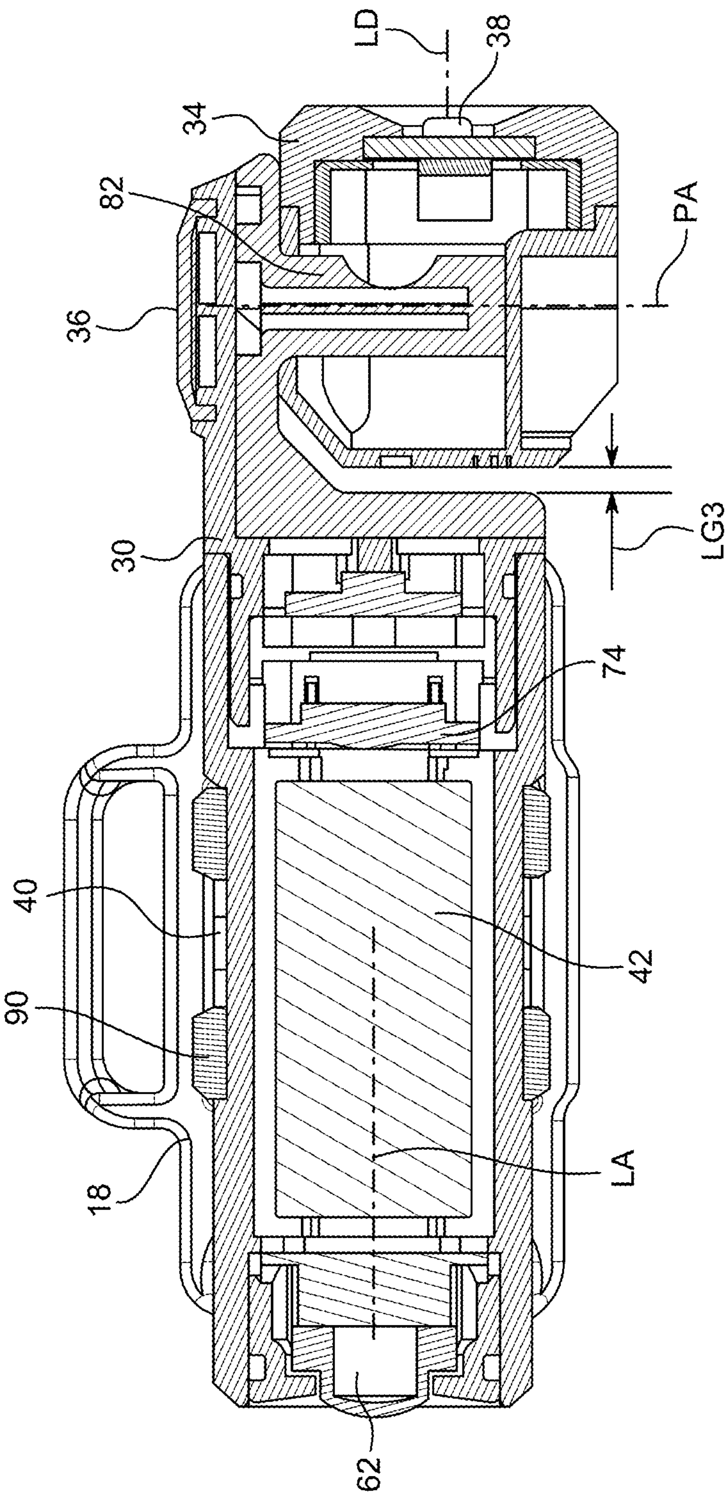
FIG. 52 is a cross-sectional view of the mount system of FIG. 4 taken through section line 52-52 and including a c-clip.

As illustrated in the cross-sectional view of FIG. 52, the light 14 may define a longitudinal gap LG3 between the body 30 and the head 34. The longitudinal gap LG3 permits the head 34 to be over-rotated to the correctional angle CA. As illustrated in FIG. 52, the control board 74 may be located between the battery 42 and the head 34. In other embodiments, as previously discussed, the control board 74 may be otherwise located within the head 34. For example, the control board 74 may be located adjacent the actuator 62, and the battery 42 may be located between the control board 74 and the head 34. FIG. 52 further illustrates the aperture 82 through which wires W pass between the control board 74 and the light emitting element 38.

Although aspects have been described in detail with reference to certain embodiments, variations and modifications exist within the scope of one or more independent aspects as described.

Various features of the disclosure are set forth in the following claims.

What is claimed is:

1. A headlamp assembly comprising:

an adjustable strap;

a mount receiver coupled to the adjustable strap;

a light including a body, a head pivotably coupled to the body by a hinge, and a light emitting element supported on the head; and a mount attachment including a first attachment structure configured to selectively engage the light and a second attachment structure configured to selectively engage the mount receiver, wherein the first attachment structure and second attachment structure are operable independent of one another such that the light is capable of being removed from the mount receiver either by removing the light from the mount attachment or by removing the light and the mount attachment from the mount receiver.

2. The headlamp assembly of claim 1, wherein the first attachment structure includes a clip configured to selectively engage the body of the light.

3. The headlamp assembly of claim 1, wherein the mount attachment is configured to be selectively magnetically coupled to the mount receiver by the second attachment structure.

4. The headlamp assembly of claim 1, wherein the second attachment structure is configured to alternately secure the mount attachment and the light to a surface that is separate from the mount receiver.

5. The headlamp assembly of claim 1, wherein the light emitting element is directed along a light direction, and wherein the light direction is adjustable in a lateral direction by pivoting the head relative to the body by the hinge.

6. The headlamp assembly of claim 1, wherein the light is removable from the mount receiver and attachable to a second mount receiver that is different than the mount receiver.

7. The headlamp assembly of claim 1, wherein the body of the light is configured to receive a battery which is configured to be electrically coupled to the light emitting element.

8. A mount system comprising:

a mount receiver being at least partially magnetic or having a mount magnet; and a light including a body having a mount surface extending at least partially along a length of the body, a light emitting element coupled to the body, a first light magnet supported adjacent the mount surface, and a second light magnet supported adjacent the mount surface and spaced apart from the first light magnet;

wherein the first light magnet and the second light magnet are configured to be magnetically coupled to different areas of the mount receiver to secure the light to the mount receiver in different orientations.

9. The mount system of claim 8, wherein the light is removable from the mount receiver and mountable to a second mount receiver.

10. The mount system of claim 8, wherein the mount receiver is configured to magnetically couple to the first light magnet to secure the light to the mount receiver in a first pitch orientation, in which the light emitting element is directed in a first light direction relative to the mount receiver.

11. The mount system of claim 10, wherein the mount receiver is configured to magnetically couple to the second light magnet to secure the light to the mount receiver in a second pitch orientation, in which the light emitting element is directed in a second light direction relative to the mount receiver that is different than the first light direction.

12. The mount system of claim 8, wherein the light further includes a third light magnet supported adjacent the mount surface and spaced apart from the first light magnet and the second light magnet, wherein the first light magnet, second light magnet, and third light magnet are configured to be magnetically coupled to different areas of the mount receiver to secure the mount receiver in different orientations.

13. The mount system of claim 12, wherein when the light is mounted in a first orientation, the light emitting element is directed along a first light direction projecting upward of the mount receiver, when the light is mounted in a second orientation, the light emitting element is directed along a second light direction projecting generally perpendicularly from the mount receiver, and when the light is mounted in a third orientation, the light emitting element is directed along a third light direction project downward of the mount receiver.

14. A mount system comprising:

a mount receiver being at least partially magnetic or having a mount magnet, the mount receiver defining a mount receiver surface; and a light including a body having a light mount surface extending at least partially along a length of the body, a light emitting element coupled to the body, a first light magnet supported adjacent the light mount surface, and a second light magnet supported adjacent the light mount surface and spaced apart from the first light magnet;

wherein the mount receiver surface is generally concave toward the light, and wherein the light mount surface is generally convex toward the mount receiver such that the light mount surface is nested with the mount receiver surface when the light is coupled to the mount receiver, and wherein the mount receiver magnetically couples with the first light magnet and the second light magnet.

15. The mount system of claim 14, wherein the mount receiver surface includes at least two planar surfaces that are angled relative to each other to form the concave receiver mount surface.

16. The mount system of claim 15, wherein the mount receiver surface includes at least three planar surfaces that are angled relative to each other to form the concave mount receiver surface.

17. The mount system of claim 14, wherein the first light magnet and the second light magnet are alternately couplable with the at least partially magnetic mount receiver or the mount magnet to secure the light in at least two different orientations.

18. The mount system of claim 14, wherein the light further comprises a head and a hinge pivotably coupling the head to the body.

19. The mount system of claim 18, wherein the light emitting element is coupled to the head and the head is pivotable relative to the body to adjust an orientation of the light emitting element relative to the body.

20. The mount system of claim 14, wherein the light is removable from the mount receiver while in a first orientation and the light is attachable to the mount receiver in a second orientation different than the first orientation, the first orientation and the second orientation each representing a pitch orientation of the light emitting element relative to the mount receiver.

* * * * *